United States Patent
Ichikawa

(10) Patent No.: US 8,222,862 B2
(45) Date of Patent: Jul. 17, 2012

(54) ELECTRICALLY POWERED VEHICLE

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 939 days.

(21) Appl. No.: 12/222,171

(22) Filed: Aug. 4, 2008

(65) Prior Publication Data

US 2009/0039831 A1 Feb. 12, 2009

(30) Foreign Application Priority Data

Aug. 10, 2007 (JP) ................................ 2007-209889

(51) Int. Cl.
*H02J 7/00* (2006.01)

(52) U.S. Cl. ......................... 320/116; 320/132; 320/149

(58) Field of Classification Search .................. 320/116, 320/132, 149, 104, 109, 123, 135, 140; 180/65.1–65.31

See application file for complete search history.

(56) References Cited

U.S. PATENT DOCUMENTS

| | | | |
|---|---|---|---|
| 6,081,097 A * | 6/2000 | Seri et al. .................... | 320/128 |
| 6,483,272 B1 | 11/2002 | Terada et al. | |
| 2002/0008496 A1 * | 1/2002 | Shamoto et al. ............. | 320/116 |
| 2004/0232884 A1 * | 11/2004 | Vaillancourt et al. ......... | 320/132 |
| 2005/0269991 A1 * | 12/2005 | Mitsui et al. .................. | 320/132 |
| 2007/0073455 A1 * | 3/2007 | Oyobe et al. ..................... | 701/22 |
| 2007/0145953 A1 * | 6/2007 | Asai et al. ..................... | 320/149 |
| 2008/0053715 A1 * | 3/2008 | Suzuki et al. .................. | 180/2.1 |
| 2009/0051322 A1 * | 2/2009 | Kubota et al. ................. | 320/134 |

FOREIGN PATENT DOCUMENTS

| | | |
|---|---|---|
| JP | A-9-182307 | 7/1997 |
| JP | A-2005-130559 | 5/2005 |
| JP | A-2005-166362 | 6/2005 |
| WO | WO 00/22714 A1 | 4/2000 |

* cited by examiner

Primary Examiner — Patrick Assouad
Assistant Examiner — Son Le
(74) Attorney, Agent, or Firm — Oliff & Berridge, PLC

(57) ABSTRACT

A first power storage unit is a battery assembly, and is divided into battery blocks of n (n is a natural number) in number each formed of several electric cells connected together in series. When a state allowing charging with an external power supply is attained, the ECU executes an operation of resetting an SOC of a first power storage unit. The ECU controls a corresponding converter to discharge the first power storage unit with a constant current, and sets reset values for battery blocks of n in number based on battery voltages and battery temperatures exhibited when any one of the battery voltages of the n battery blocks becomes lower than a reset voltage. The ECU resets the SOCs of the battery blocks of the first power storage unit to the respective reset values thus set.

8 Claims, 12 Drawing Sheets

ELECTRICALLY POWERED VEHICLE

This nonprovisional application is based on Japanese Patent Application No. 2007-209889 filed on Aug. 10, 2007 with the Japan Patent Office, the entire contents of which are hereby incorporated by reference.

BACKGROUND OF THE INVENTION

1. Field of the Invention

The present invention relates to an electrically powered vehicle equipped with a power storage system for supplying an electric power to a drive source, and particularly to a structure for keeping a high estimation accuracy of a state of charge of the power storage system.

2. Description of the Background Art

Recently, hybrid vehicles and electric vehicles that are driven by a drive power of an electric motor have attracted attention as vehicles developed in view of the environment. These electrically powered vehicles are equipped with power storage systems for supplying electric powers to drive sources, i.e., the electric motors, respectively. Discharging and charging of the power storage system are performed in view of, e.g., a state of charge (which may be simply referred to as an "SOC" hereinafter) of the power storage system. Overcharge and overdischarge of the power storage system can be avoided by keeping the SOC within an appropriate range.

A battery assembly has been widely used as the power storage system. The battery assembly is formed of a plurality of battery modules (i.e., components thereof) connected together in series, and each battery module has a plurality of cells each formed of, e.g., a nickel hydrogen battery. The charge and discharge of the battery assembly is controlled by sensing battery voltages, e.g., of a plurality of battery blocks and arithmetically estimating the SOC from the sensed battery voltages.

However, when the battery characteristics deteriorate due to a long-term use of the battery assembly, variations occur in capacity between the battery blocks. For example, Japanese Patent Laying-Open No. 2005-166362 has disclosed a control system of a hybrid vehicle that can accurately grasp the variations in SOC that occurred between a plurality of cells in a battery module.

According to this system, it is determined whether a state of charge of the battery assembly has met conditions under which a memory effect is liable to occur. When the conditions are met, deep charge and discharge are executed multiple times to erase the memory effect of the battery assembly, and then processing is performed to sense the variations in SOC that occurred in the cells of the battery modules forming the battery assembly. Thereby, the system can accurately sense the variations in characteristic of the battery assembly.

However, as the method of sensing the variations in the battery assembly, Japanese Patent Laying-Open No. 2005-166362 has disclosed merely a method in which the battery assembly is discharged with a constant current, an SOC value is measured when the voltage variations of the battery assembly become large, and it is determined based on the SOC value whether the variations in SOC are present in the battery modules or not. It has not sufficiently disclosed a method of estimating the SOC of each battery module.

More specifically, when the battery characteristics deteriorate, the estimation accuracy for the SOC lowers. Particularly, the charge/discharge power of the electrically powered vehicle is extremely larger in quantity than that of consumer products, and the quantity of changes in environment temperature thereof is also large. Therefore, a remarkable difference occurs between the arithmetically estimated SOC and the actual SOC, resulting in a problem that sufficient estimation accuracy cannot be obtained. However, Japanese Patent Laying-Open No. 2005-166362 described above has not disclosed countermeasures against the above problem.

SUMMARY OF THE INVENTION

An object of the invention is to provide an electrically powered vehicle having a charge/discharge control device that can increase an estimation accuracy of an SOC of a power storage system.

According to the invention, an electrically powered vehicle includes a power storage system supplying an electric power to a drive source; and a charge/discharge control device charging and discharging the power storage system. The power storage system is formed of a plurality of chargeable and dischargeable power storage units connected in series. The charge/discharge control device includes a discharging unit discharging the power storage system with a constant current, and a state-of-charge estimating unit estimating a state of charge of each of the plurality of power storage units, and resetting the states of charge of the plurality of power storage units to reference values according to predetermined timing based on temporal changes in voltage values of the plurality of power storage units during discharging of the power storage system. The state-of-charge estimating unit sets the respective reference values for the plurality of power storage units based on voltage values and temperatures of the plurality of power storage units exhibited according to the predetermined timing, and resets the states of charge of the plurality of power storage units to the set reference values, respectively.

According to the above electrically powered vehicle, the reference values for the respective power storage units are set during the execution of the reset operation such that these reference values may contain variations in state of charge caused between the plurality of power storage units forming the power storage system. Thereby, the resetting of the states of charge can be performed on all the plurality of power storage units. This can increase accuracy of estimating the states of charge of the respective power storage units.

Preferably, the discharging unit sets the predetermined timing such that the voltage value of any one of the plurality of power storage units reaches a predetermined reference voltage according to the above predetermined timing. The state-of-charge estimating unit includes a first setting unit holding in advance a relationship between the temperature and the state of charge of each the power storage unit exhibited when the voltage value of each the power storage unit attains the predetermined reference voltage, and referring to the above relationship to set the reference value for the one of the power storage units, and a second setting unit setting the reference value for the remaining power storage unit(s) by correcting the reference value for the one of the power storage units based on the voltage value(s) of the remaining power storage unit(s).

According to the electrically powered vehicle described above, the reference values can be set for all the power storage units while preventing overdischarge of the power storage unit having a relatively small state of charge. Thereby, the reset operation can be performed on all the plurality of power storage units.

Preferably, the second setting unit holds in advance a relationship between the voltage value of the power storage unit and the state of charge of the power storage unit exhibited when the power storage unit is discharged with the constant current, and estimates a difference in state of charge between the remaining power storage unit(s) and the one of the power storage units with reference to the relationship.

According to the electrically powered vehicle described above, the variations in state of charge caused between the power storage units can be simply and accurately estimated, based on the discharge characteristics of the power storage units that are held in advance. Thereby, the reference values can be set accurately for all the power storage units. Consequently, the estimation accuracy of the states of charge of all the power storage units can be increased.

Preferably, the discharging unit varies a discharge current of the power storage system according to the temperatures of the plurality of power storage units at the start of discharging the power storage system.

According to the electrically powered vehicle described above, the discharge current can be set to a relatively high current value, e.g., when the temperature of the power storage unit falls within a preset temperature range, and the discharge current can be set to a relatively low current value, e.g., when the temperature of the power storage unit does not fall within the preset temperature range. Thereby, the reset operation can be rapidly performed on the power storage system while preventing such a situation that the increase in discharge current causes overheating of the hot power storage unit or causes overdischarging of the cold power storage unit having a lowered SOC.

Preferably, the discharging unit varies a discharge current of the power storage system according to the voltage values of the plurality of power storage units.

According to the electrically powered vehicle described above, for example, when the voltage value and the state of charge are large, the discharge current is set to a relatively high current value. When the voltage value and the state of charge are small, the discharge current can be set to a relatively low current value. Thereby, the state of charge can be rapidly reduced immediately after the start of the reset operation. When the state of charge is close to the reference value, the state of charge can be slowly reduced. Consequently, the reset operation can be rapidly performed on the power storage system.

Preferably, the state-of-charge estimating unit varies the predetermined reference voltage according to the temperatures of the plurality of power storage units at the start of discharging the power storage system According to the electrically powered vehicle described above, for example, the reference voltage can be set high, e.g., when the temperature of the power storage unit is higher than a preset upper temperature value. Thereby, the reset operation can be performed rapidly, and the overheating of the hot power storage unit can be prevented.

Preferably, the electrically powered vehicle further includes a charger receiving an electric power from an external power supply and performing external charging on the power storage system. The discharging unit discharges the power storage system with a constant current when the power storage system enters a state allowing charging with the external power supply. The charge/discharge control device further includes a charging unit externally charging the power storage system after the states of charge of the plurality of power storage units are reset to the reference values.

According to the electrically powered vehicle described above, the reset operation can be performed on all the power storage units forming the power storage system before the external charging so that the estimation accuracy of the SOCs of the power storage units can be increased.

Preferably, the power storage system includes a plurality of power storage devices connected in parallel with each other to the drive source, and each formed of the plurality of power storage units connected in series. The electrically powered vehicle further includes a plurality of voltage converting units corresponding to the plurality of power storage devices, respectively. The discharging unit controls the voltage converting unit corresponding to the first power storage device among the plurality of power storage devices to discharge the first power storage device, and controls the voltage converting unit(s) corresponding to the remaining power storage device(s) to charge the remaining power storage device(s) with a current discharged from at least the first power storage device when the plurality of power storage devices enter a state allowing charging with the external power supply.

According to the electrically powered vehicle described above, even when the electrically powered vehicle is equipped with the plurality of power storage devices, it is possible to increase the estimation accuracy of the SOCs of the plurality of power storage units forming each power storage device.

The invention can increase the estimation accuracy of the SOC of the power storage device.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will be described below with reference to the drawings. In the following description, the same or corresponding portions bear the same reference numbers.

(Schematic Structure of Vehicle)

Figure 1:
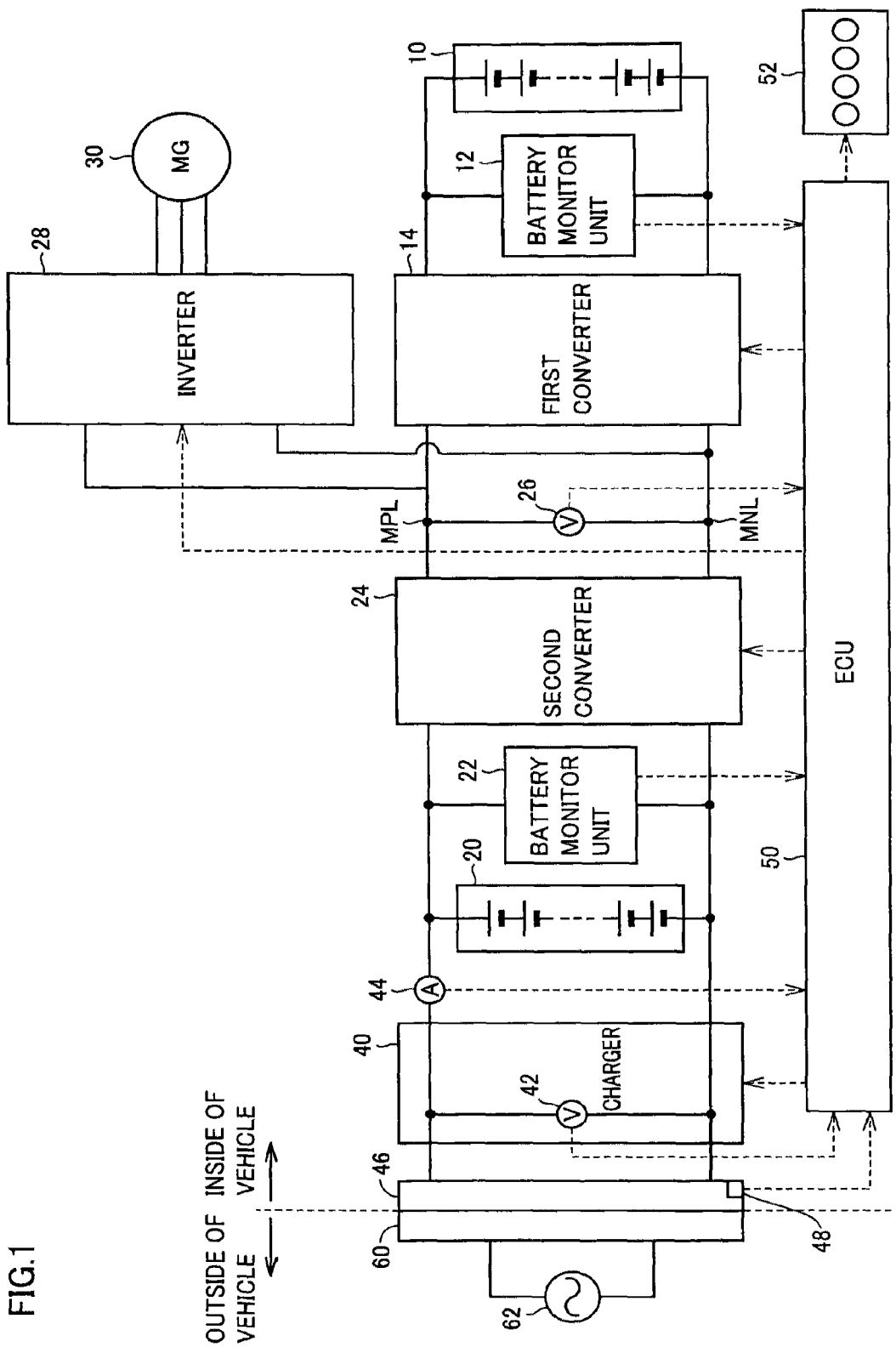
FIG. 1 schematically shows a structure of an electrically powered vehicle equipped with a charge/discharge control device of a power storage system according to an embodiment of the invention.

FIG. 1 schematically shows a structure of an electrically powered vehicle equipped with a charge/discharge control device of a power storage system according to an embodiment of the invention.

Referring to FIG. 1, a vehicle according to an embodiment of the invention is typically a hybrid vehicle, is equipped with an internal combustion engine 52 and a Motor Generator (MG) 30, and is driven by controlling drive powers supplied therefore to attain an optimum ratio between them. Further, the vehicle is equipped with a power storage system for supplying an electric power to motor generator 30. For example, the power storage system is formed of a plurality of (e.g., two) power storage units 10 and 20. Provision of the plurality of power storage units increases a charge/discharge capacity of the power storage system, and thereby it is intended to improve a running performance such as an acceleration performance and a continuous travel distance of the vehicle. When the system of the electrically powered vehicle is active, these power storage units 10 and 20 can be charged by receiving the power produced by the operation of engine 52. When the system of the electrically powered vehicle is not operating, power storage units 10 and 20 can be charged by electrically connecting it to an external power supply 62 via a charger 40, a charge connector 46 and a charge plug 60.

Charge connector 46 forms a coupling mechanism for supplying external power supply 62 such as a commercial power supply to the vehicle. In an external charging operation, charge connector 46 is coupled to charge plug 60 arranged at the vehicle so that external power supply 62 is electrically connected to charger 40 mounted on the vehicle. Thereby, first and second power storage units 10 and 20 are connected to external power supply 62 via charger 40.

Charger 40 may be arranged outside the vehicle. As external power supply 62, an electric power generated by a solar cell panel arranged, e.g., on a roof of a house (not shown) may be used instead of or in addition to the commercial power supply.

The vehicle includes engine 52 and motor generator 30 as drive power sources. Motor generator 30 is a three-phase AC motor, and is driven by the electric power accumulated in first and second power storage units 10 and 20. Motor generator 30 is supplied with an electric power produced by converting a DC power into an AC power by an inverter 28.

The drive power of motor generator 30 is transmitted to the wheels (not shown). Thereby, motor generator 30 assists engine 52, or operates to produce a drive power for running the vehicle. During regenerative braking of the hybrid vehicle, the wheels drive motor generator 30 so that motor generator 30 operates as an electric power generator. Thereby, motor generator 30 operates as a regenerative brake that converts the braking energy into the electric power. The electric power generated by motor generator 30 is converted by inverter 28 from an AC power into a DC power, and then is stored in first and second power storage units 10 and 20.

Each of first and second power storage units 10 and 20 is an electric power storage element that is chargeable and dischargeable, and is typically formed of a secondary battery such as a lithium ion battery or a nickel hydrogen battery, or a power storage element such as an electrical double layer capacitor. Each of first and second power storage units 10 and 20 is a battery assembly formed of a plurality of electric cells connected together in series, as will be described later.

Battery monitor units 12 and 22 are employed as means for sensing the states of first and second power storage units 10 and 20, and provide the sensed states of the corresponding power storage units to an ECU (Electric Control Unit) 50, respectively.

A first converter 14 that can mutually change the DC voltages is arranged between first power storage unit 10 and inverter 28. First converter 14 mutually steps up or down an input/output voltage of first power storage unit 10 and a line voltage between positive and negative bus lines MPL and MNL. Likewise, a second converter 24 that can mutually covert the DC voltages is arranged between second power storage unit 20 and inverter 28. Inverter 28 mutually steps up or down an input/output voltage of second power storage unit 20 and the line voltage between positive and negative bus lines MPL and MNL. Thus, first and second converters 14 and 24 are connected in parallel to the power line pair, i.e., positive and negative bus lines MPL and MNL. The step-up and step-down operations by converters 14 and 24 are controlled according to a switching instruction from ECU 50.

A voltage sensor 26 is arranged between positive and negative bus lines MPL and MNL, and senses the line voltage between them for providing a sensed value to ECU 50. A voltage sensor 42 is arranged inside charger 40 for sensing a voltage supplied from external power supply 62 and providing a sensed value to ECU 50. A current sensor 44 senses a value of a charge current supplied from charger 40 to first and second power storage units 10 and 20, and provides a sensed value to ECU 50.

ECU 50 is primarily formed of a CPU (Central Processing Unit), a storage unit such as a RAM (Random Access Memory) and a ROM (Read Only Memory) and an input/output interface. The CPU reads out a program prestored, e.g., in the ROM to the RAM, and executes it so that ECU 50 executes the control for the vehicle running and the external charging.

ECU 50 calculates a state of charge (which may be simply referred to as an "SOC" hereinafter) of each of first and second power storage units 10 and 20. The SOC can be represented in an absolute value (e.g., in units of [A·h]) of quantity of charges in power storage unit. In this specification, the SOC is represented as a ratio (0%-100%) of the quantity of charges with respect to the charge capacity of the power storage unit. Structures that calculate the SOCs of power storage units 10 and 20 can be implemented by various known techniques, and therefore specific structures for such calculation are not described.

As the structure for externally charging first and second power storage units 10 and 20, the vehicle further includes charge connector 46 and charger 40. For externally charging first and second power storage units 10 and 20, charge connector 46 is coupled to charge plug 60 so that external power supply 62 supplies a power to charger 40. Charge connector 46 includes a coupling sensor 48 for sensing a state of coupling between charge plug 60 and charge connector 46. ECU 50 receives a coupling signal from coupling sensor 48, and senses therefrom the state allowing the charging by the external power supply.

In this specification, "the state allowing the charging by the external power supply" representatively means a state in which charge connector 46 is physically fitted into charge plug 60. Instead of the structure shown in FIG. 1, such a structure may be employed that an electric power is supplied by electromagnetically coupling the external power supply and the vehicle without making contact between them, and more specifically that primary and secondary coils are arranged on the external power supply side and the vehicle side, respectively, and the electric power supply is performed by using a mutual inductance between the primary and secondary coils. In this structure, "the state allowing the charging by the external power supply" means a state in which the primary and secondary coils are relatively positioned.

Charger 40 is a device for receiving the power from external power supply 62 and performing the external charging on first and second power storage units 10 and 20. Charger 40 converts the power supplied from external power supply 62 into a power suitable for charging power storage units 10 and 20. More specifically, charger 40 includes a voltage converting unit for converting the voltage supplied from external power supply 62 into the voltage suitable for charging power storage units 10 and 20, and a current controller that produces a DC voltage by rectifying the AC voltage converted by the above voltage converting unit, and controls the charging current supplied to power storage units 10 and 20 according to a charging current instruction provided from ECU 50. Instead of these structures, charger 40 may be implemented, e.g., by an AC-DC switching regulator.

Particularly, ECU 50 according to this embodiment issues reset requests (which may also be referred to as "SOC1 reset request" and "SOC2 reset request" hereinafter, respectively) to first and second power storage units 10 and 20, respectively, and thereby resets the SOCs when the state allowing the charging by the external power supply is attained.

More specifically, ECU 50 controls the corresponding converter (e.g., first converter 14) to discharge the power storage unit (e.g., first power storage unit 10) to be reset, and controls the corresponding converter (e.g., second converter 24) so that the remaining power storage unit (e.g., second power storage unit 20) may be charged with the discharge current discharged from at least the power storage unit to be reset, i.e., the reset target. When the chargeable current of the remaining power storage unit is larger than the discharge current discharged from the charging unit to be reset, charger 40 may supply the charging current for compensating for a difference between them. The presence/absence of reset requests for power storage units 10 and 20 may be determined based on charge/discharge frequencies of them, respectively.

ECU 50 resets the SOC of the power storage unit to be reset to a reference value (which may also be referred to as a "reset value" hereinafter, and is equal to, e.g., 5%), based on the voltage of the above power storage unit to be reset. More specifically, when the voltage value of the power storage unit to be reset becomes lower than the predetermined reference voltage (i.e., reset voltage), ECU 50 resets the SOC to the reset value.

When the power storage unit to be reset is reset to attain the predetermined reset value, ECU 50 performs the external charging, and specifically charges the power storage unit to be reset with the charging current supplied from charger 40. Since the SOC of each power storage unit is reset as described above when the external charging is to be performed, the SOC can be accurately estimated without being affected by deterioration of the battery characteristics that may occur due to a long-term use of the power storage units.

(Control Structure)

Figure 2:
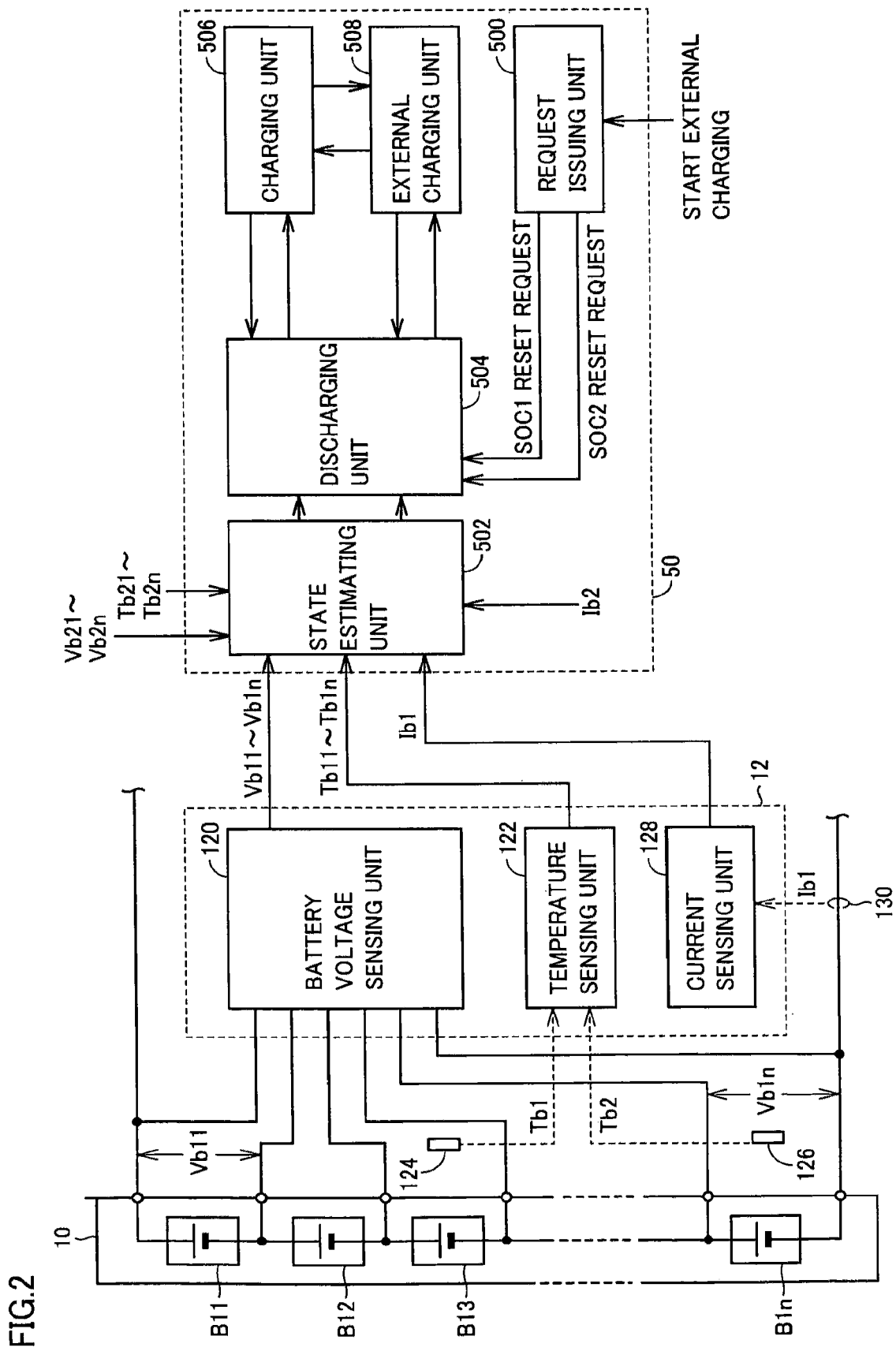
FIG. 2 is a block diagram showing a control structure of an ECU according to the embodiment of the invention.

Referring to FIG. 2, description will now be given on the control structure for implementing the reset operation in the charge/discharge control device of the power storage system according to the embodiment.

FIG. 2 is a block diagram showing a control structure of ECU 50 according to the embodiment of the invention. In a typical example, each function block shown in FIG. 2 is implemented by executing a prestored program by ECU 50. However, a part or all of these functions may be implemented by dedicated hardware.

Referring to FIG. 2, ECU 50 includes a request issuing unit 500, a state estimating unit 502, a discharging unit 504, a charging unit 506 and an external charging unit 508.

Request issuing unit 500 issues the reset requests for power storage units 10 and 20. More specifically, when request issuing unit 500 receives a signal for starting the external charging based on the coupling signal provided from coupling sensor 48 (FIG. 1), it issues the SOC1 and SOC2 reset requests for first and second power storage units 10 and 20, respectively.

State estimating unit 502 estimates the SOC of first power storage unit 10 based on battery voltages $Vb11$-$Vb1n$, battery temperatures $Tb11$-$Tb1n$ and a charge/discharge current $Ib1$ provided from battery monitor unit 12. Likewise, state estimating unit 502 estimates the SOC of second power storage unit 20 based on battery voltages $Vb21$-$Vb2n$, battery temperatures $Tb21$-$Tb2n$ and a charge/discharge current $Ib2$ provided from battery monitor unit 22.

More specifically, battery monitor unit 12 includes, as means for sensing the state of first power storage unit 10, a battery voltage sensing unit 120, a temperature sensing unit 122, a current sensing unit 128, temperature sensors 124 and 126, and a current sensor 130.

As already described, first power storage unit 10 is the battery assembly formed of the plurality of the electric cells connected in series. First power storage unit 10 is divided into battery blocks $B11$-$B1n$ of n (n is a natural number) in number each formed of the several electric cells connected in series. Although not shown, second power storage unit 20 has a similar structure, and is divided into battery blocks $B21$-$B2n$ of n in number.

Battery voltage sensing unit 120 senses battery voltages $Vb11$-$Vb1n$ of battery blocks $B11$-$B1n$, and provides sensed battery voltages $Vb11$-$Vb1n$ to state estimating unit 502.

Temperature sensing unit 122 senses internal temperatures $Tb1$ and $Tb2$ of a plurality of portions of first power storage unit 10 based on sensor outputs provided from a plurality of temperature sensors 124 and 126 attached to these portions, respectively. Temperature sensing unit 122 arithmetically obtains battery temperatures $Tb11$-$Tb1n$ of the respective battery blocks based on internal temperatures $Tb1$ and $Tb2$ thus sensed, and provides a result of this arithmetic to state estimating unit 502.

Current sensing unit 128 senses charge/discharge current $Ib1$ of first power storage unit 10 flowing through battery blocks $B11$-$B1n$ based on the sensor output of current sensor 130, and provides a sensed value to state estimating unit 502.

In ECU 50, state estimating unit 502 arithmetically obtains $SOC11$-$SOC1n$ for battery blocks $B11$-$B1n$ based on battery voltages $Vb11$-$Vb1n$, charge/discharge current $Ib1$ and battery temperatures $Tb11$-$Tb1n$ provided from battery monitor unit 12, respectively.

Various well-known techniques can be used for the structure calculating the SOC of each battery block. For example, state estimating unit 502 obtains the SOC by adding a provisional SOC calculated from an open-circuit voltage value to a correction SOC calculated from an integral of charge/discharge current Ib1. More specifically, state estimating unit 502 calculates open-circuit voltage values for respective battery blocks from charge/discharge current Ib1 and battery voltages Vb11-Vb1n at respective points in time, and calculates the provisional SOC of each battery block by applying the open-circuit voltage value thus calculated to the reference charge/discharge characteristics that are experimentally obtained in advance for representing a relationship between the SOC and the open-circuit voltage value in the reference state of the battery block. Further, state estimating unit 502 integrates charge/discharge current Ib1 to calculate the correction SOC, and obtains the SOC by adding the provisional SOC to this correction SOC.

State estimating unit 502 further obtains arithmetically SOC21-SOC2n for respective battery blocks B21-B2n based on battery voltages Vb21-Vb2n, charge/discharge current Ib2 and battery temperatures Tb21-Tb2n received from battery monitor unit 22. State estimating unit 502 provides SOC11-SOC1n and SOC21-SOC2n arithmetically obtained for first and second power storage units 10 and 20, respectively, to discharging unit 504.

When the operation of resetting first and second power storage units 10 and 20 are to be executed, discharging unit 504 controls the voltage converting operations of the first and second converters 14 and 24. More specifically, when request issuing unit 500 issues the SOC1 reset request and the SOC2 reset request, discharging unit 504 controls the corresponding converters so that first and second power storage units 10 and 20 may be discharged with constant current values, respectively.

For example, discharging unit 504 in this embodiment first selects first power storage unit 10 as the target of the requested reset, and controls corresponding first converter 14 to discharge a constant current from first power storage unit 10. Then, discharging unit 504 selects second power storage unit 20 as the target of the requested reset, and controls corresponding second converter 24 to discharge a constant current from second power storage unit 20.

Figure 3:
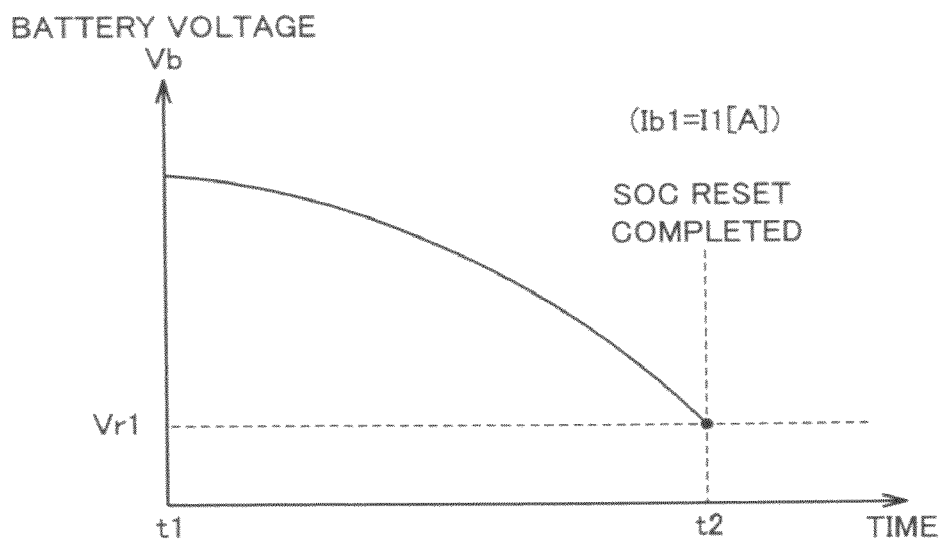
FIG. 3 illustrates changes in battery voltage during a reset operation.

FIG. 3 illustrates changes in battery voltage during the reset operation. In FIG. 3, first power storage unit 10 is handled as the reset target, and battery voltages Vb11-Vb1n of battery blocks B11-B1n sensed by battery voltage sensing unit 120 (FIG. 2) may be collectively referred to as "Vb".

Referring to FIG. 3, unit us assumed that the charging by the external power supply is allowed at a time t1. When a reset request (SOC1 reset request) for first power storage unit 10 is issued, the current control is performed to discharge first power storage unit 10 to be reset. More specifically, at and after time t1, discharge current Ib1 of first power storage unit 10 to be reset is kept at a constant current value I1, and remaining second power storage unit 20 is charged with the charge current including at least the discharge current of first power storage unit 10.

When the discharging of first power storage unit 10 with constant current value I1 continues, battery voltage Vb of each battery block lowers. State estimating unit 502 resets the SOCs of the battery blocks forming first power storage unit 10 to a predetermined reset value (e.g., of 5%). More specifically, if it is assumed that battery voltage Vb becomes lower than reset voltage Vr1 at a time t2. Thereby, state estimating unit 502 resets the SOCs of the battery blocks of first power storage unit 10 to a reset value at time t2.

Figure 4:
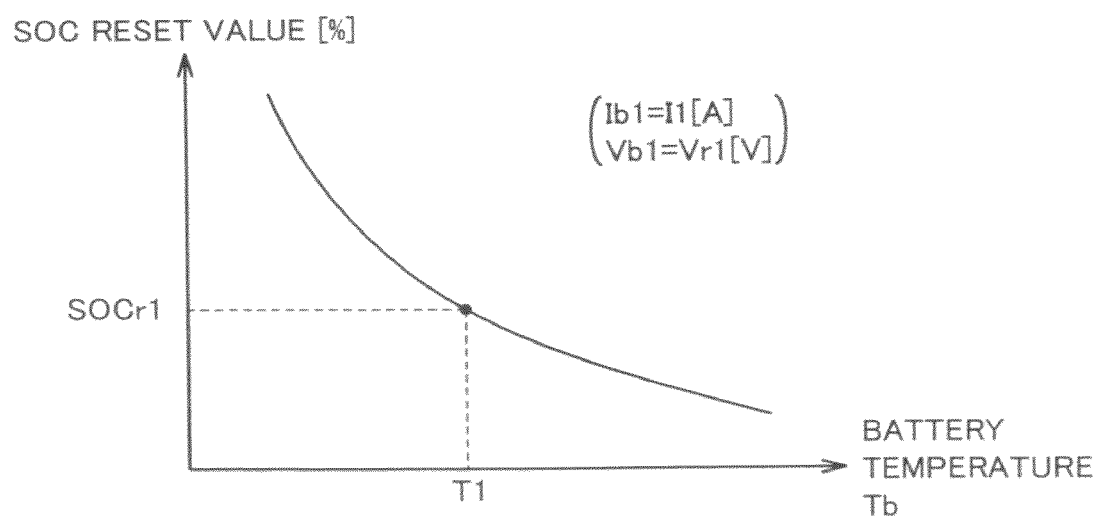
FIG. 4 shows an example of a reset value for a battery block.

This reset value may be set in advance based on the characteristic value and the like of the power storage unit, or may be dynamically set according to the situation of use of the power storage unit. FIG. 4 shows an example of the reset value for the battery block. In FIG. 4, battery temperatures Th11-Tb1n of battery blocks B11-B1n sensed by temperature sensing unit 122 (FIG. 2) are collectively referred to as "Tb".

Referring to FIG. 4, the reset value is set to lower with rising of battery temperature Tb. This relationship between the reset value and battery temperature Tb is set based on the relationship between the SOC of the battery block and battery temperature Tb that are experimentally obtained in advance by discharging first power storage unit 10 with constant current value I1.

Thereby, when battery temperature Th is equal, e.g., to T1 at time t2 (corresponding to the time when battery voltage Vb becomes lower than reset voltage Vr1) in FIG. 3, the reset value is set to a reset value SOCr1 corresponding to battery temperature T1 with reference to the relationship in FIG. 4. Consequently, the SOC of the battery block is reset to reset value SOCr1.

State estimating unit 502 has stored a map of the reset values for the battery blocks obtained experimentally in advance, and particularly a map in which discharge current Ib1 and battery temperature Th are defined as parameters. State estimating unit 502 sets the reset value based on battery temperature Th sensed by temperature sensing unit 122.

Referring to FIG. 2 again, charging unit 506 controls the corresponding converter in the reset operation such that, when the power storage unit to be reset is discharged with a constant current, the remaining power storage unit may be charged with the discharge current discharged from the power storage unit to be reset. More specifically, charging unit 506 charges first power storage unit 10 with the electric power discharged from second power storage unit 20. After the reset operation of second power storage unit 20 is completed, charging unit 506 charges second power storage unit 20 with the electric power discharged from first power storage unit 10.

For example, the voltage on the output side of second converter 24 (i.e., on the side connected to first converter 14) is set higher than the voltage on the output side of first converter 14 (i.e., on the side connected to second converter 24). Thereby, the power discharged from second power storage unit 20 is supplied to first power storage unit 10. Conversely, when the voltage on the output side of first converter 14 is set higher than the voltage on the output side of second converter 24, the power discharged from first power storage unit 10 is supplied to second power storage unit 20. The charging method other than the above may be employed.

When the power storage unit to be reset is being discharged, external charging unit 508 charges the remaining power storage unit with the power supplied from external power supply 62 via charger 40. After first and second power storage units 10 and 20 are reset, external charging unit 508 charges first and second power storage units 10 and 20 with the power supplied from external power supply 62 via charger 40.

In this manner, when the charging by the external power supply becomes possible, ECU 50 executes the reset operation on the SOCs for first and second power storage units 10 and 20. During the reset operation, ECU 50 controls the corresponding converter such that a constant current may be discharged from the power storage unit to be reset, and also controls the corresponding converter such that the remaining power storage unit may be charged with at least the current discharged from the power storage unit to be reset.

Figure 5:
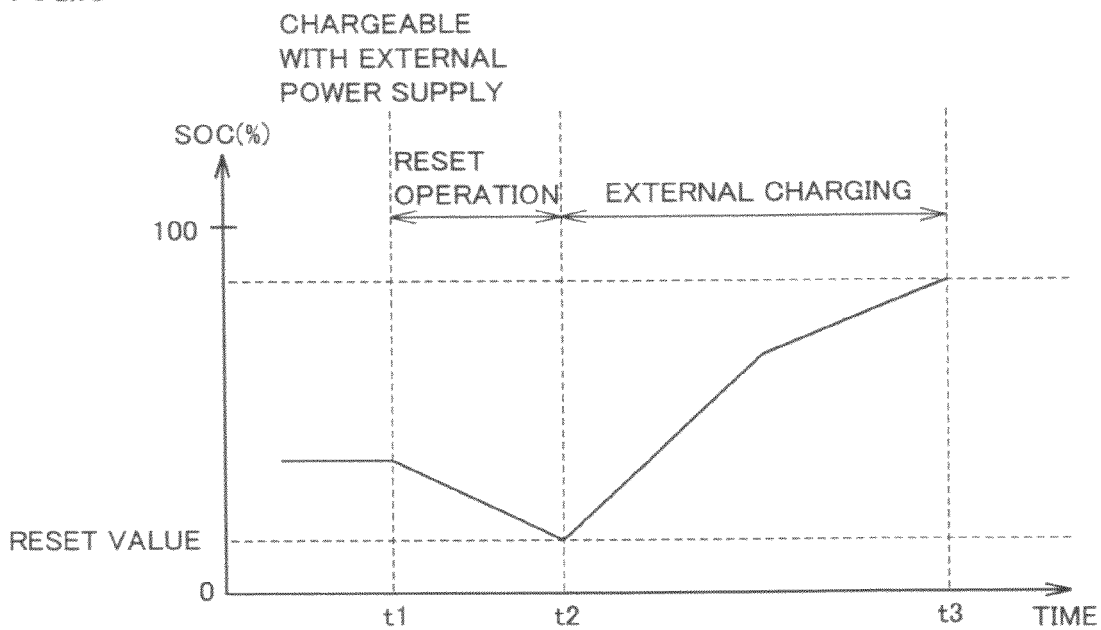
FIG. 5 shows changes with time in SOC of a power storage unit to be reset.

FIG. 5 shows changes with time in SOC of the power storage unit to be reset with time.

Referring to FIG. 5, the charging with the external power supply becomes possible at time t1. When a reset request (SOC1 reset request) for first power storage unit 10 is issued, the current control is performed to discharge first power storage unit 10 to be reset. More specifically, at and after time t1, the discharge current of first power storage unit 10 to be reset is kept at a constant current value. Also, remaining second power storage unit 20 is charged with the charging current including at least the discharge current of first power storage unit 10.

It is assumed that the discharging of first power storage unit 10 with a constant current value continues, and the battery voltage (discharge voltage) Vb of first power storage unit 10 becomes lower than predetermined reset voltage Vr1 (FIG. 3) at time t2. In this case, the estimated value of the SOC of first power storage unit 10 is reset to a predetermined reset value, e.g., of 5% at time t2.

After the reset operation (after time t2), the original external charging starts. The charging will be finally completed at a time t4 when the SOC exhibits the fully charged state.

By resetting the SOC of each power storage unit when the external charging is to be performed, it is possible to eliminate the influence that may be exerted by the deterioration of the battery characteristics due to the long-term use of the power storage unit, and the SOC can be accurately estimated.

However, power storage units 10 and 20 according to the embodiment are the battery assemblies. Therefore, variations in battery characteristic occur between the plurality of battery blocks forming the battery assembly. During the reset operation shown in FIG. 3, therefore, a difference occurs in change in battery voltage Vb between the battery blocks. Therefore, the timing according to which battery voltage Vb becomes lower than reset voltage Vr1 in a certain battery block may be different from that of another battery block.

For preventing overdischarging of the battery block having a relatively small SOC, it is effective to stop the discharging when at least one of battery voltages Vb11-Vb1$n$ of battery blocks B11-B1$n$ sensed by battery voltage sensing unit 120 (FIG. 2) becomes lower than reset voltage Vr1. Thus, the reset operation ends when the SOC of one of battery blocks B11-B1$n$ is reset.

However, the above structure can reset the SOC of the foregoing one of the battery blocks, but cannot reset the SOCs of the remaining battery blocks other than the above one battery block. This results in a problem that the estimated values of the SOCs of the remaining battery blocks still contain errors with respect to the actual SOCs.

Figure 6:
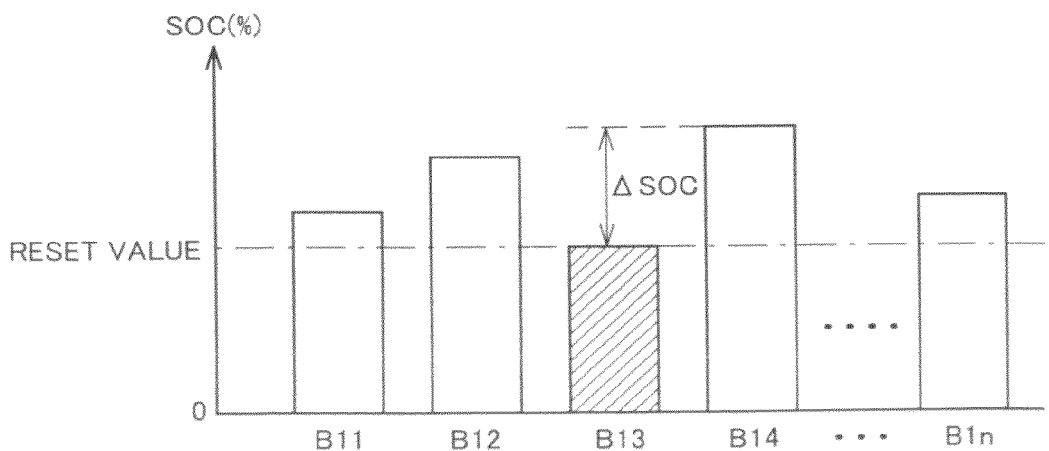
FIG. 6 shows an example of the SOC of each of battery blocks.

More specifically, referring to the SOCs of battery blocks B11-B1$n$ shown in FIG. 6, when the reset operation ends in response to the fact that battery voltage Vb13 of one (e.g., battery block B13) of the battery blocks becomes lower than reset voltage Vr1, the SOC of only battery block B13 has the reset value, and the SOCs of the remaining battery blocks have deviations of $\Delta$SOC with respect to the reset value. Consequently, it is difficult to obtain a sufficient estimation accuracy of the SOCs of the remaining battery blocks.

For preventing the variations in SOC between the battery blocks, it is necessary to control discharge current Ib1 of each battery block independently of the others. However, the battery blocks are connected in series together so that it is substantially impossible to perform such current control.

For increasing the estimation accuracy of the SOCs of all the battery blocks, ECU 50 according to this embodiment is configured such that the deviation of the SOC of each remaining battery block from the reset value is sensed, the reset value is corrected based on each deviation of the SOC thus sensed and thereby the SOC of each remaining battery block is reset to the reset value thus corrected.

Figure 7:
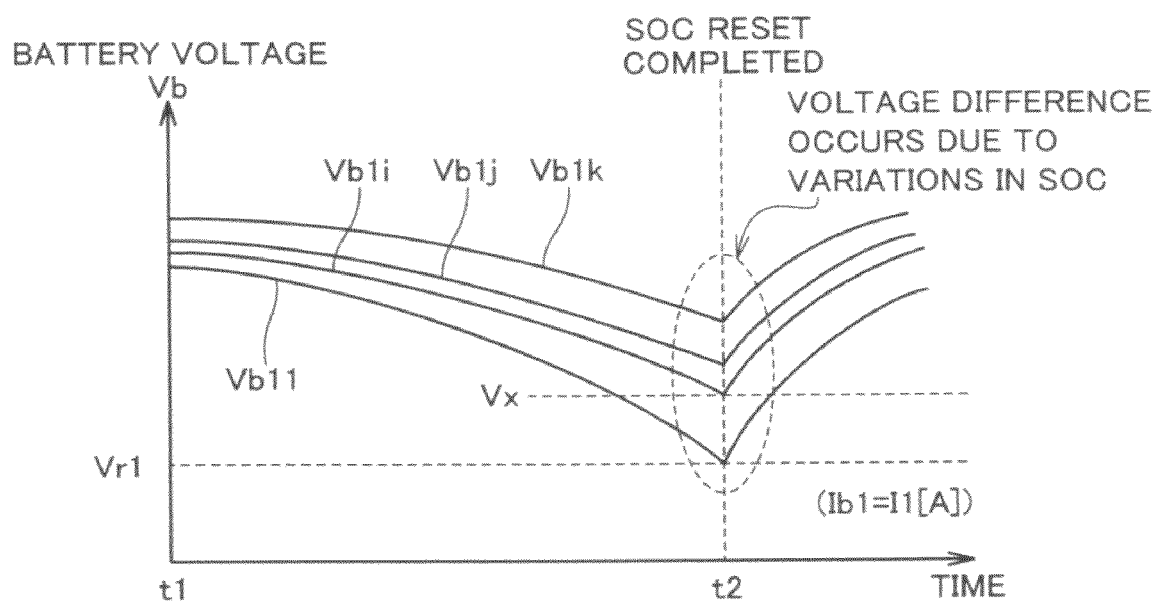
FIG. 7 shows an example of changes in battery voltage of respective battery blocks during a reset operation.
Figure 8:
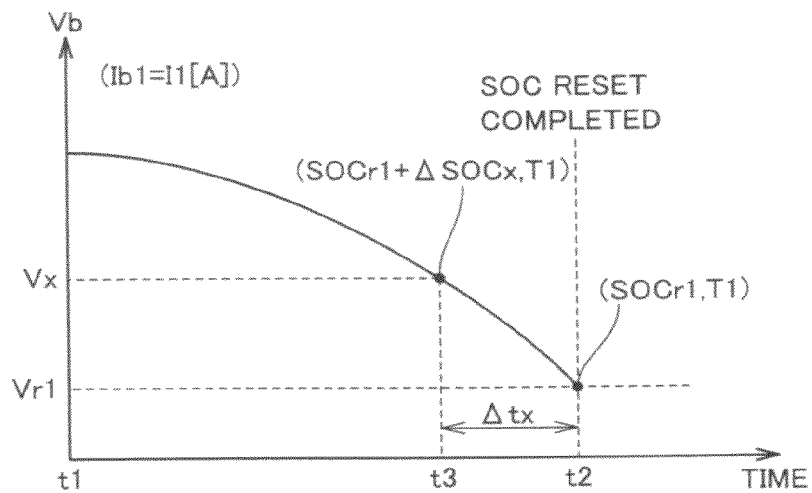
FIG. 8 illustrates a method of correcting the reset value for the battery block.
Figure 9:
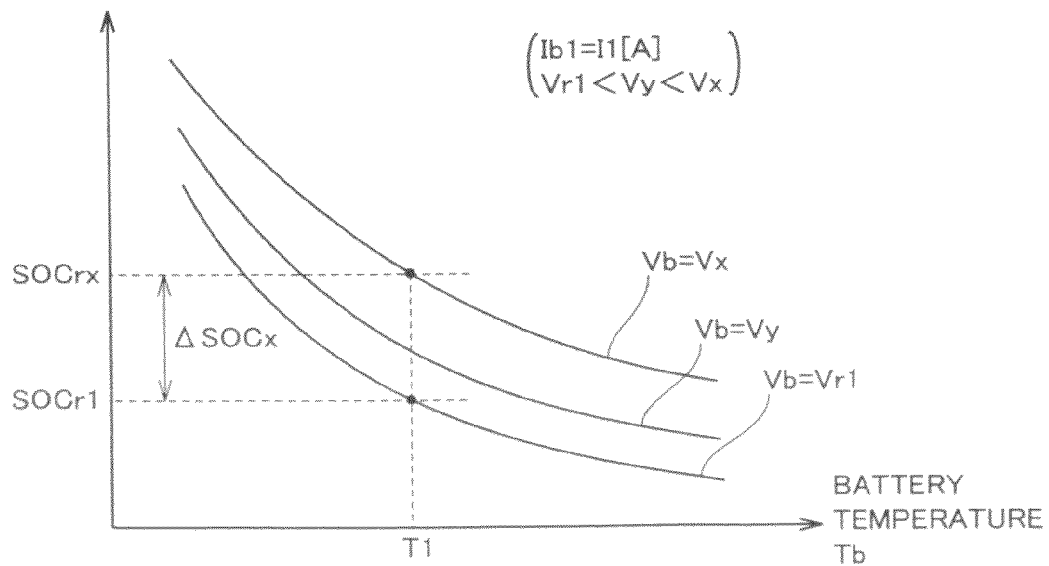
FIG. 9 shows a relationship between the corrected reset value and the battery temperature.

Referring to FIGS. 7 to 9, the control structure for implementing the operation of resetting all the battery blocks is described below.

FIG. 7 shows an example of the changes in battery voltage of respective battery blocks during the reset operation.

Referring to FIG. 7, when battery blocks B11-B1$n$ are discharged with a constant current I1 during the reset operation of first power storage unit 10, each of battery voltages Vb11-Vb1$n$ of battery blocks B11-B1$n$ represents temporal changes that are different from those of the other battery voltages. Therefore, when battery voltage Vb11 of battery block B11 becomes lower than reset voltage Vr1 (time t2), battery voltages Vb1$i$, Vb1$j$ and Vb1$k$ (where i, j and k are natural numbers other than one) of other battery blocks B1$i$, B1$j$ and B1$k$ have not yet attained reset voltage Vr1, and have differences with respect to reset voltage Vr1, respectively.

These voltage differences exhibit a certain relationship with respect to deviation $\Delta$SOC (FIG. 6) of the SOC with respect to the reset value. Therefore, by sensing the battery voltage of each battery block, the SOC can be estimated from the sensed battery voltage based on the voltage difference between the battery voltage and reset voltage Vr1 as well as the temporal changes of the battery voltage during the reset operation shown in FIG. 8.

More specifically, referring to FIG. 7, it is assumed that battery voltage Vb1$i$ of battery block B1$i$ is equal to voltage Vx (>Vr1) at time t2. When this voltage Vx is viewed with respect to the temporal change of battery voltage Vb in FIG. 8, voltage Vx matches battery voltage Vb at a time t3 before time t2. Therefore, it can be understood that battery voltage Vb lowers from voltage Vx to reset voltage Vr1 when the discharging of the battery block continues further for a time $\Delta$tx (=t2−t3) after time t3, and thereby voltage.

In this case, the quantity of the discharge performed by discharging the battery block with constant current I1 for time $\Delta$tx is represented by a product of discharge current I1 and time $\Delta$tx, By arithmetically obtaining a ratio of this quantity of discharge with respect to the charge capacity of the battery block, it is possible to obtain a deviation $\Delta$SOCx between the SOC at time t3 and the SOC at time t2.

The SOC of battery block B11 at time t2 is reset to reset value SOCr1 to be attained when battery temperature Th is equal to temperature T1, based on the relationship between the reset value and the battery temperature shown in FIG. 4. Therefore, the SOC at time t3 is obtained by adding above deviation $\Delta$SOCx to this reset value SOCr1. As described above, battery voltage Vx at time t3 is equal to the battery voltage of battery block B1$i$ at time t2. Therefore, the SOC of battery block B1$i$ at time t2 can be estimated as (SOCr1+$\Delta$SOCx). Accordingly, by using this estimated SOC value (=SOCr1+$\Delta$SOCx) as the reset value of battery block B1$i$, the SOC of battery block B1$i$ can be reset.

Further, the SOCs of battery blocks B1$j$ and B1$k$ other than battery block B1$i$ can be reset using, as the reset value, the estimated SOC values each obtained in substantially the same manner by estimating the SOC at time t2 based on the battery voltage at the same time.

FIG. 9 shows a relationship between the corrected reset value and battery temperature Tb. When battery voltage Vb of any one of the battery blocks becomes lower than reset voltage Vr1 while the power storage unit is being discharged with constant current value I1, battery voltages Vb of the remaining battery blocks other than the above one battery block are obtained, and the relationship in FIG. 9 is obtained by correcting the relationship between the reset value and battery temperature Th shown in FIG. 4 in the foregoing method based on above battery voltages Vb of remaining battery blocks.

State estimating unit 502 has stored the relationship between the corrected reset value and battery temperature Th shown in FIG. 9 as the reset value setting map (i.e., a map for resetting the reset value) in a storage area (not shown). When battery voltage Vb of any one of the battery blocks becomes lower than reset voltage Vr1, state estimating unit 502 receives battery voltages Vb and battery temperatures Tb of the remaining battery blocks. Thereby, state estimating unit 502 extracts the reset value corresponding to the battery voltage and battery temperature for each remaining battery block from the reset value setting map, and sets it as the corrected reset value.

When the reset value is set for each of the remaining battery blocks, the SOCs of the remaining battery blocks are reset to the reset values thus set. Consequently, the SOCs of all the battery blocks forming the power storage unit can be reset so that the SOC estimation accuracy of the power storage unit can be high.

Figure 10:
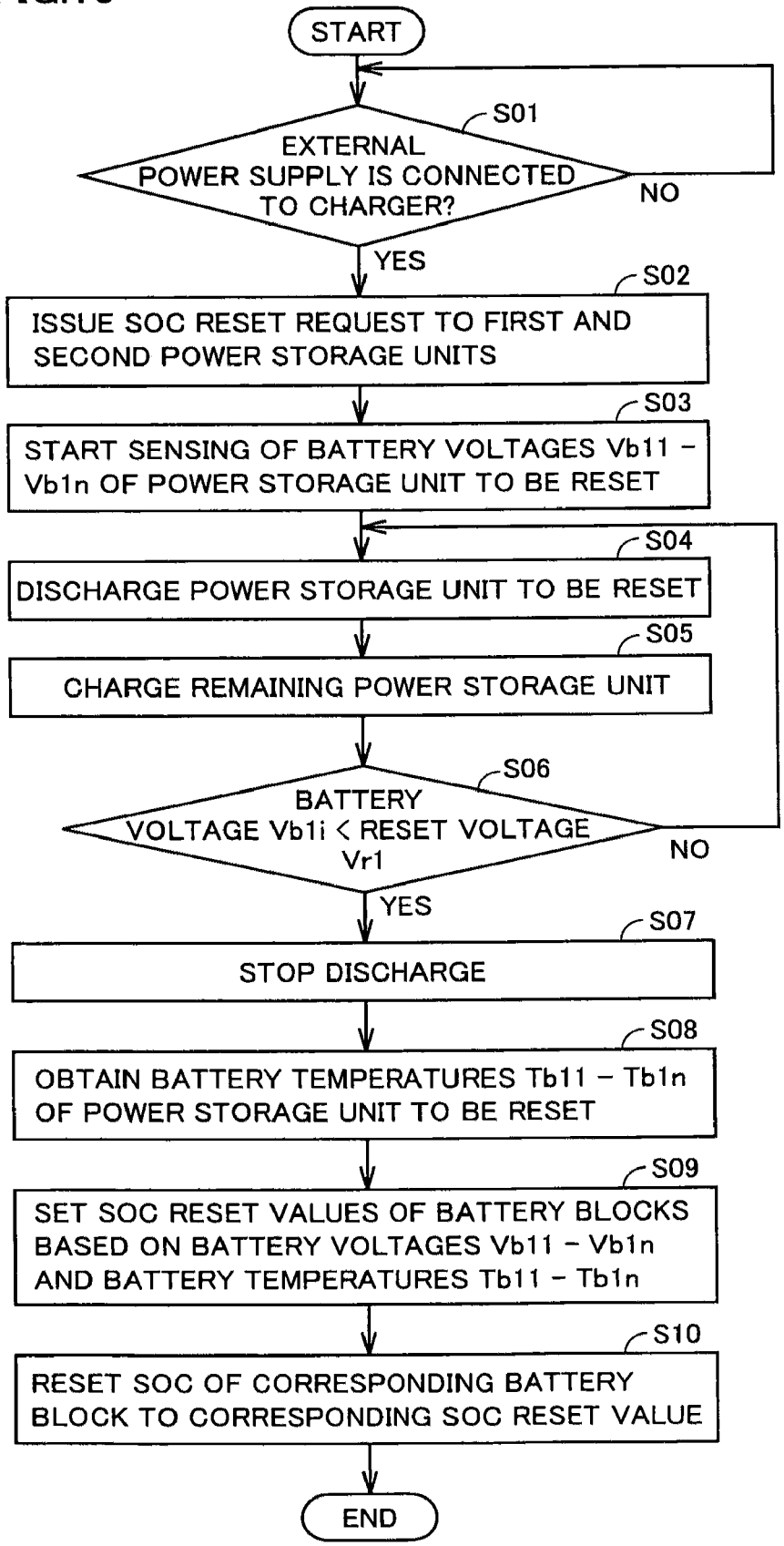
FIG. 10 is a flowchart illustrating a processing procedure of the reset operation according to an embodiment of the invention.

FIG. 10 is a flowchart representing the processing procedure of the reset operation according to the embodiment of the invention. The processing in each step shown in FIG. 10 is implemented by ECU 50 (FIG. 1) operating as each control block shown in FIG. 2.

Referring to FIGS. 2 and 10, ECU 50 operating as request issuing unit 500 determines whether external power supply 62 of the vehicle is connected to charger 40 or not, based on the coupling signal provided from coupling sensor 48 in FIG. 1 (step S01).

When external power supply 62 is not connected to charger 40 (NO in step S01), the process returns to the initial step.

Conversely, when external power supply 62 is connected to charger 40 (YES in step S01), ECU 50 operating as request issuing unit 500 determines that the charging by the external power supply is allowed, and issues the SOC1 reset request for first power storage unit 10 and the SOC2 reset request for second power storage unit 20 (step S02). In this embodiment, first power storage unit 10 is first selected as the reset target, i.e., the power storage unit to be reset, the following description will be given on the reset operation of first power storage unit 10.

First, battery voltage sensing unit 120 (FIG. 2) included in battery monitor unit 12 corresponding to first power storage unit 10 starts the operation of sensing battery voltages Vb11-Vb1n of battery blocks B11-B1n (step S03). ECU 50 operating as state estimating unit 502 receives battery voltages Vb11-Vb1n from battery monitor unit 12.

Then, ECU 50 operating as discharging unit 504 controls first converter 14 to discharge first power storage unit 10 with a constant current (step S04), and controls the voltage converting operation of second converter 24 to charge second power storage unit 20 with at least the current discharged from first power storage unit 10 (step S05).

Further, ECU 50 functioning as discharging unit 504 determines whether any one of battery voltages Vb11-Vb1n of battery blocks B11-B1n is lower than reset voltage Vr1 or not (step S06).

When none of battery voltages Vb11-Vb1n is lower than reset voltage Vr1 (NO in step S06), the process returns to step S04.

Conversely, when any one of battery voltages Vb11-Vb1n is lower than reset voltage Vr1 (YES in step S06), ECU 50 operating as discharging unit 504 stops the discharging of first power storage unit 10 (step S07).

Then, ECU 50 operating as state estimating unit 502 obtains battery temperatures Tb11-Tb1n from temperature sensing unit 122 (FIG. 2) of battery monitor unit 12 when any one of battery voltages Vb11-Vb1n becomes lower than reset voltage Vr1 (step S08). ECU 50 operating as state estimating unit 502 refers to the reset value setting map in FIG. 9, and sets the reset values for respective battery blocks B11-B1n based on battery voltages Vb11-Vb1n and battery temperatures Tb11-Tb1n at the point in time when any one of battery voltages Vb11-Vb1n becomes lower than reset voltage Vr1 (step S09). ECU 50 operating as state estimating unit 502 resets battery blocks B11-B1n of first power storage unit 10 to the respective reset values that are already set (step S10). When the resetting of the SOCs of all battery blocks B11-B1n is completed, the processing relating to the reset operation for first power storage unit 10 ends. Subsequently, the substantially same processing is performed by selecting second power storage unit 20 as the reset target, and the reset operation for all the battery blocks in second power storage unit 20 will be completed.

The processing in step S09 may be configured such that ECU 50 functioning as state estimating unit 502 changes the reset value according to the magnitude of the discharge current. More specifically, the reset value may be set to increase with increasing of the discharge current. In this case, ECU 50 records in advance the reset value setting map shown in FIG. 9 for each of the plurality of discharge currents having different magnitudes, respectively, in a record area.

[First Modification]

Modifications of the embodiment of the invention will be described below. A first modification differs from the foregoing embodiment in that the lowering rate of the SOC during the reset operation changes with the battery temperature that is exhibited at the start of the reset operation. Other structures are the same as those of the foregoing embodiment. Therefore, description thereof is not repeated.

Figure 11:
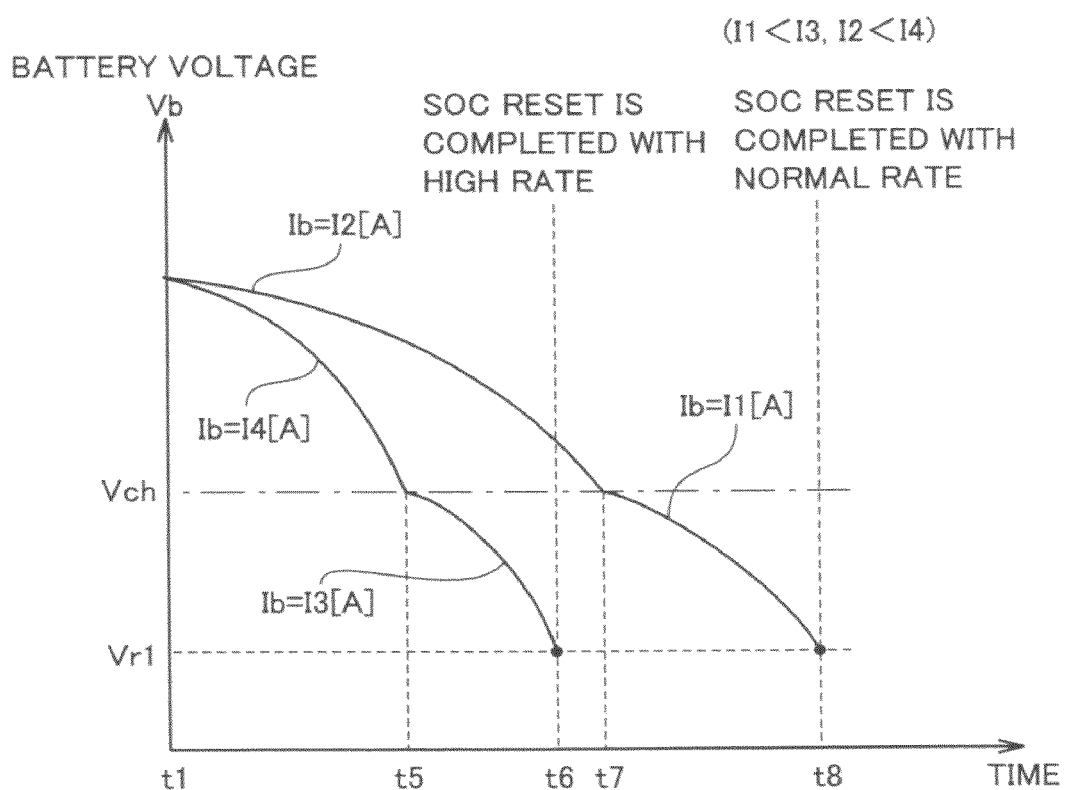
FIG. 11 illustrates changes in battery voltage during the reset operation according to a first modification of the invention.

FIG. 11 illustrates changes in battery voltage during the reset operation according to the first modification. In FIG. 11, first power storage unit 10 is the reset target, and battery voltages Vb11-Vb1n of battery blocks B11-B1n sensed by battery voltage sensing unit 120 (FIG. 2) will be collectively referred to as "Vb".

Discharging unit 504 according to this modification has two kinds of lowering rates of a "normal rate" and a "high rate" for the SOC during the reset operation.

Referring to FIG. 11, in the case where the "normal rate" is selected and the state allowing the charging by the external power supply is attained at time t1, discharging unit 504 controls first converter 14 so that discharge current Ib1 may take a current value I2 when battery voltage Vb of the battery block of the power storage unit (first power storage unit 10) that is being discharged is larger than a predetermined threshold voltage Vch. Conversely, when battery voltage Vb of the battery block of the power storage unit that is being discharged is equal to or lower than predetermined threshold voltage Vch, discharging unit 504 controls first converter 14 so that discharge current Ib1 may take current value I1 lower than current value I2.

By changing discharge current Ib1 according to battery voltage Vb as described above, the SOC rapidly lowers immediately after the start of the reset operation, and the SOC slowly lowers when the SOC is close to the reset value. Consequently, the intended estimation accuracy of the SOC can be ensured, and the reset operation can be performed fast.

In the case where the "high rate" is selected and the state allowing the charging by the external power supply is attained at time t1, discharging unit 504 controls first converter 14 so that discharge current Ib1 may take a current value I4 larger than foregoing current value I2 when battery voltage Vb of the battery block of the power storage unit (first power storage unit 10) that is being discharged is larger than predetermined threshold voltage Vch. Conversely, when battery voltage Vb of the battery block of the power storage unit that is being discharged is equal to or lower than predetermined threshold voltage Vch, discharging unit 504 controls first converter 14 so that discharge current Ib1 may take a current value I3 lower than current value I4.

As is apparent from FIG. 11, even when the "high rate" is selected, the estimation accuracy of the SOC can be ensured and the reset operation can be rapidly performed by changing discharge current Ib1 corresponding to battery voltage Vb. Further, when the "high rate" is selected, discharge current Ib1 is set to the current value higher than that corresponding to the "normal rate" so that the reset operation can be performed more rapidly.

Discharging unit 504 selects one of the "normal rate" and the "high rate" based on the battery temperature that is exhibited at the start of the reset operation. More specifically, when the battery temperature at the start of the reset operation falls within a predetermined temperature range that is set in advance, discharging unit 504 selects the "high rate". When the battery temperature at the start of the reset operation does not fall within the predetermined temperature range, discharging unit 504 selects the "normal rate".

As described above, the "high rate" is selected only when the battery temperature falls within the predetermined temperature range. This configuration can suppress overheat of the power storage unit that may be caused by discharging of the power storage unit with a high current, when the battery temperature is higher the above temperature range. When the battery temperature is lower than the above temperature range, it is possible to prevent excessive taking-out of an electric power from the power storage unit having a lowered charge/discharge performance. Consequently, the power storage unit can be reset rapidly while protecting the power storage unit.

Figure 12:
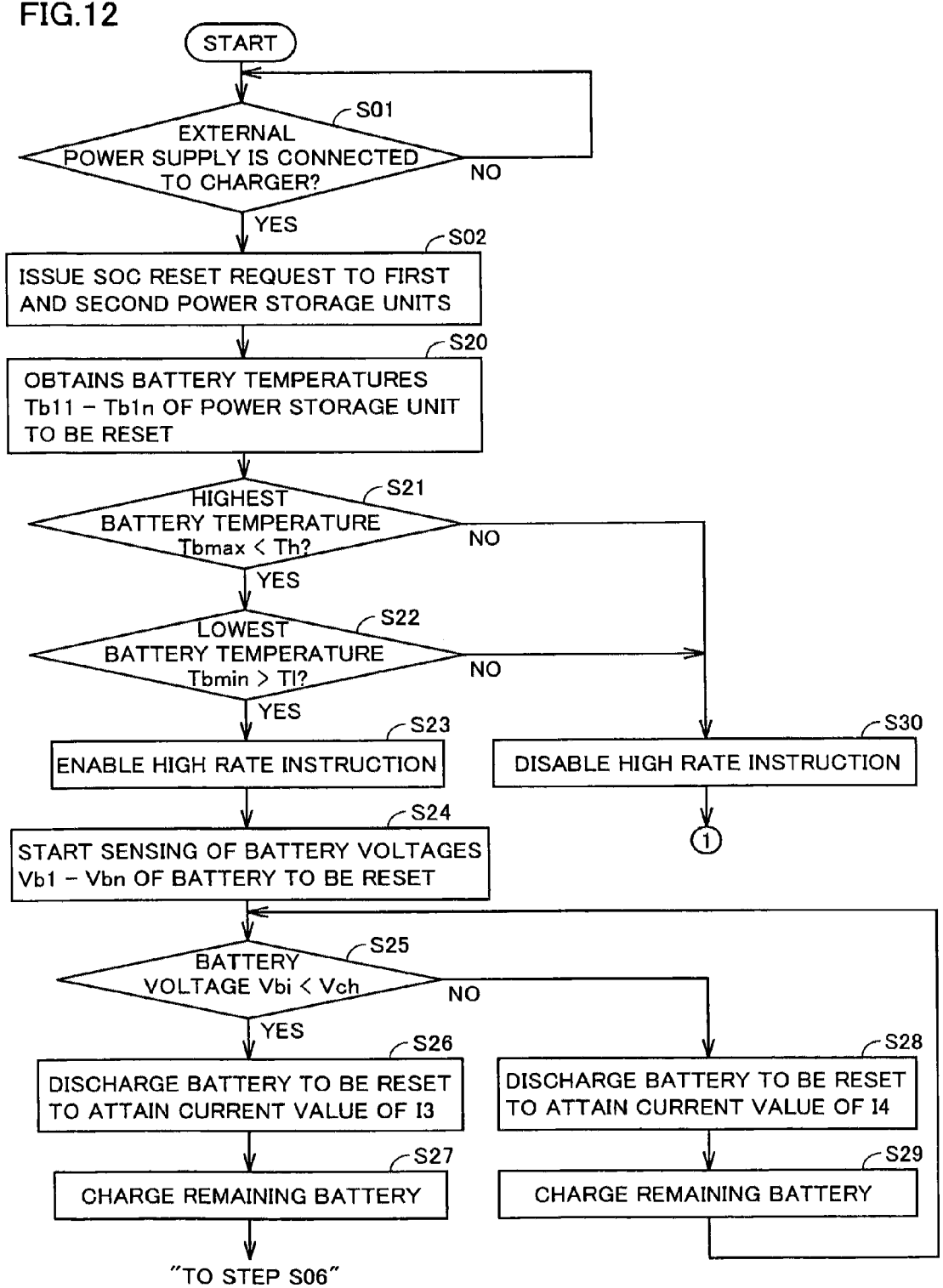
FIG. 12 is a flowchart illustrating the processing procedure of the reset operation according to the first modification of the embodiment of the invention.
Figure 13:
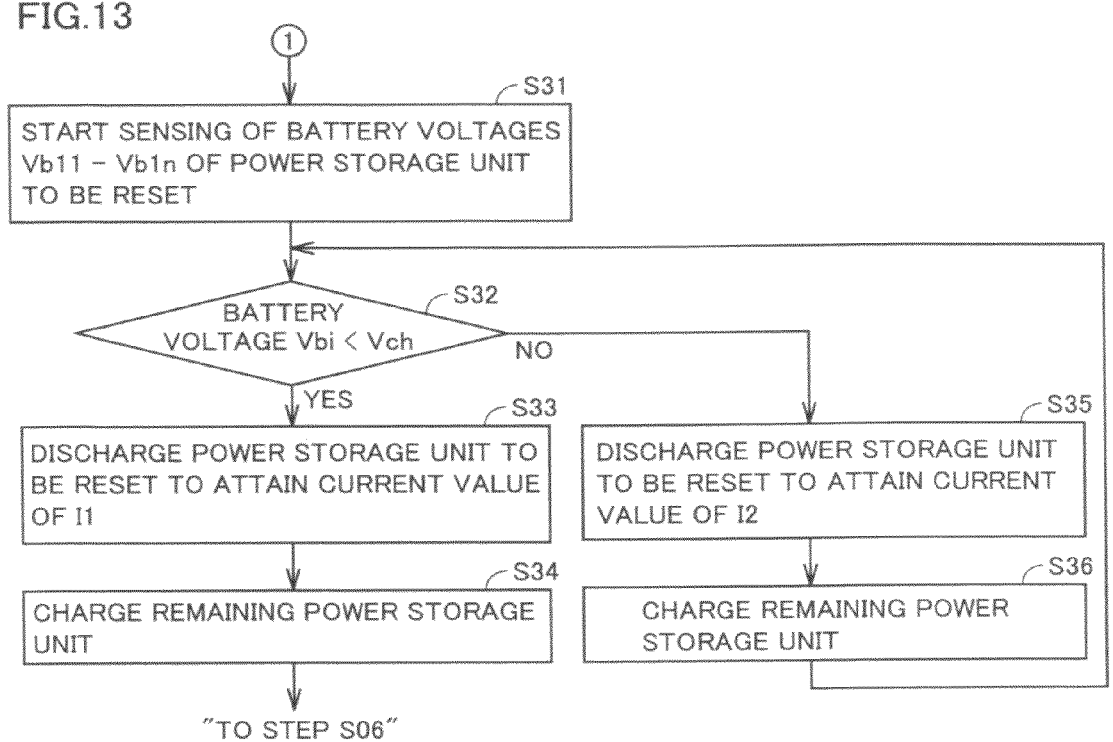
FIG. 13 is a flowchart illustrating the processing procedure of the reset operation according to the first modification of the embodiment of the invention.

FIGS. 12 and 13 are flowcharts illustrating the processing procedures of the reset operation according to the first modification of the embodiment of the invention. The processing in each of steps shown in FIGS. 12 and 13 is implemented by ECU 50 (FIG. 1) operating as the various control blocks shown in FIG. 2.

Referring to FIGS. 2 and 12, ECU 50 operating as request issuing unit 500 determines based on the coupling signal from coupling sensor 48 (FIG. 1) whether external power supply 62 of the vehicle is connected to charger 40 or not (step S01).

When external power supply 62 is not connected to charger 40 (NO in step S01), the process returns to the initial stage.

Conversely, when external power supply 62 is connected to charger 40 (YES in step S01), ECU 50 operating as request issuing unit 500 determines that the charging by the external power supply is allowed, and issues the SOC1 and SOC2 reset requests to first and second power storage unit 10 and unit 20, respectively (step S02). In this modification, first power storage unit 10 is selected as the reset target, similarly to the foregoing embodiment. Therefore, the following description will be given on the reset operation of first power storage unit 10.

First, ECU 50 operating as discharging unit 504 obtains battery temperatures Tb11-Tb1$n$ when temperature sensing unit 122 (FIG. 2) included in battery monitor unit 12 corresponding to first power storage unit 10 issues the reset request (step S20). ECU 50 operating as discharging unit 504 specifies a highest value (highest battery temperature) Tbmax among obtained battery temperatures Tb11-Th1$n$, and determines whether this highest battery temperature Tbmax is lower than an upper limit Th of the predetermined temperature range that is already set or not (step S21).

When highest battery temperature Tbmax is equal to or higher than upper limit Th (NO in step S21), ECU 50 operating as discharging unit 504 disables the high rate instruction selecting the "high rate" already described (step S30).

Conversely, when highest battery temperature Thmax is lower than upper limit Th (YES in step S21), ECU 50 operating as discharging unit 504 subsequently specifies a lowest value (lowest battery temperature) Thmin among battery temperatures Tb11-Tb1$n$ that are obtained, and determines whether lowest battery temperature Tbmin is higher than lowest value T1 in the predetermined range or not (step S22).

When lowest battery temperature Tbmin is equal to or lower than lower limit T1 (NO in step S22), ECU 50 operating as discharging unit 504 disables the high rate instruction (step S30).

Conversely, when lowest battery temperature Tbmin is higher than lower limit T1 (YES in step S22), i.e., when battery temperatures Tb11-Tb1$n$ fall within a predetermined temperature range, the high rate instruction is enabled (step S23).

ECU 50 operating as discharging unit 504 receives the output from battery voltage sensing unit 120 (FIG. 2) included in battery monitor unit 12, and thereby starts the sensing operation for battery voltages Vb11-Vb1$n$ of battery blocks B11-B1$n$ (step S24).

ECU 50 operating as discharging unit 504 determines whether any one of sensed battery voltages Vb11-Vb1$n$ is equal to or lower than predetermined threshold voltage Vch or not (step S25).

When all battery voltages Vb11-Vb1$n$ are larger than threshold voltage Vch (NO in step S25), ECU 50 operating as discharging unit 504 controls first converter 14 to discharge first power storage unit 10 with current value I4 in FIG. 11 (step S28). Further, ECU 50 controls the voltage converting operation by second converter 24 so that second power storage unit 20 is charged with at least discharge current Ib1 discharged from first power storage unit 10 (step S29). Then, the process returns to step S25.

Conversely, when any one of battery voltages Vb11-Vb1$n$ is equal to or lower than threshold voltage Vch (YES in step S25), ECU 50 operating as discharging unit 504 controls first converter 14 to discharge first power storage unit 10 with current value I3 (step S26), and controls the voltage converting operation performed by second converter 24 to charge second power storage unit 20 with at least discharge current Ib1 discharged from first power storage unit 10 (step S27). Then, the process proceeds to step S06 in the flowchart of FIG. 10.

Thus, ECU 50 operating as discharging unit 504 stops the discharging of first power storage unit 10 when any one of battery voltages Vb11-Vb1$n$ of battery blocks B11-B1$n$ becomes lower than reset voltage Vr1 (step S07 in FIG. 10). ECU 50 operating as state estimating unit 502 sets the reset value for each of battery blocks B11-B1$n$ based on battery voltages Vb11-Vb1$n$ and battery temperatures Tb11-Tb1$n$ that are exhibited when any one of battery voltages Vb11-Vb1$n$ becomes lower than reset voltage Vr1 (steps S08 and S09 in FIG. 10).

Figure 14:
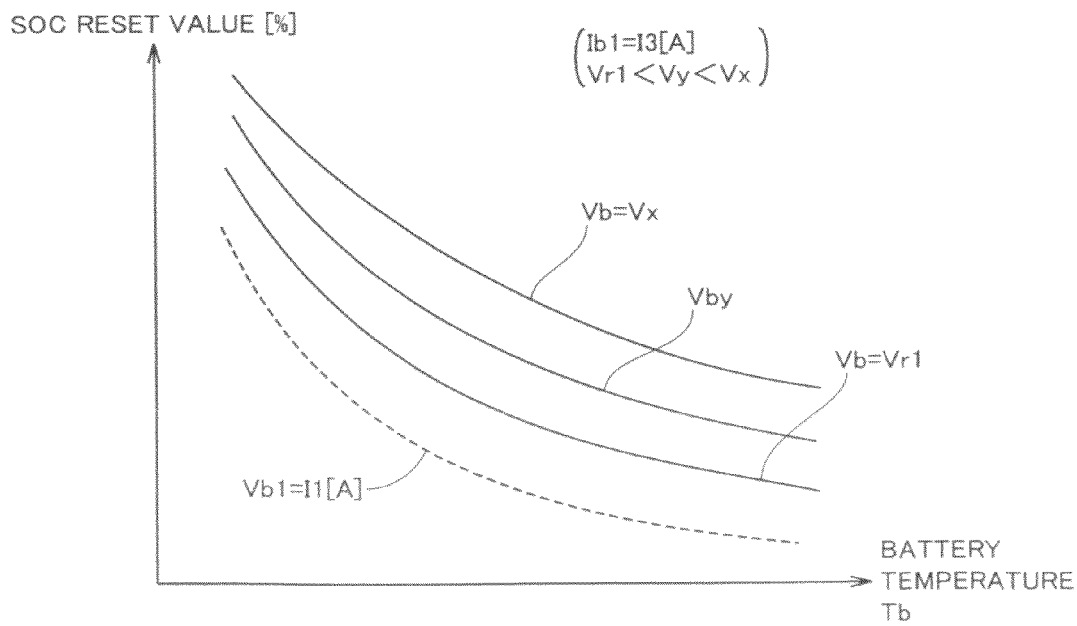
FIG. 14 shows a relationship between the corrected reset value and the battery temperature exhibited when a discharge current takes a current value I3.

In a storage area (not shown), ECU 50 operating as state estimating unit 502 has stored, as the reset value setting map, the relationship between the corrected reset value and the battery temperature that are obtained when discharge current Ib1 shown in FIG. 14 takes current value I3. When battery voltage Vb of any one of the battery blocks becomes lower than reset voltage Vr1 while first power storage unit 10 is being discharged with current value I3, ECU 50 receives battery voltages Vb and battery temperatures Tb at this point in time. Thereby, for each of the remaining battery blocks, ECU 50 extracts the reset value corresponding to the battery voltage and battery temperature from the reset value setting map in FIG. 14, and sets it as the corrected reset value.

ECU 50 operating as state estimating unit 502 resets the SOC of battery blocks B11-B1n of first power storage unit 10 to the respective reset values thus set (step S10). When the resetting of the SOCs of all battery blocks B11-B1n is completed, the processing relating to the reset operation for first power storage unit 10 ends. Subsequently, second power storage unit 20 is selected as the reset target, and substantially the same processing is performs so that the reset operation on all the battery blocks of second power storage unit 20 is completed.

Returning to step S30 in FIG. 12, when the high rate instruction is disabled, ECU 50 operating as discharging unit 504 receives the output of battery voltage sensing unit 120 (FIG. 2) included in battery monitor unit 12, and thereby starts the operation of sensing battery voltages Vb11-Vb1n of battery blocks B11-B1n (step S31).

ECU 50 operating as discharging unit 504 determines whether any one of sensed battery voltages Vb11-Vb1n is equal to or lower than predetermined threshold voltage Vch or not (step S32).

When all battery voltages Vb11-Vb1n are larger than threshold voltage Vch (NO in step S32), ECU 50 operating as discharging unit 504 controls first converter 14 to discharge first power storage unit 10 with current value I2 in FIG. 11 (step S35). Further, ECU 50 controls the voltage converting operation in second converter 24 such that second power storage unit 20 may be charged with at least discharge current Ib1 discharged from first power storage unit 10 (step S36). Then, the process returns to step S31.

Conversely, when any one of battery voltages Vb11-Vb1n is equal to or lower than threshold voltage Vch (YES in step S32), ECU 50 operating as discharging unit 504 controls first converter 14 to discharge first power storage unit 10 with current value I1 (step S33), and controls the voltage converting operation in second converter 24 to charge second power storage unit 20 with at least discharge current Ib1 discharged from first power storage unit 10 (step S34). Then, the process proceeds to step S06 in the flowchart of FIG. 10.

In the method described above, when ECU 50 operating as discharging unit 504 sets the respective reset values for battery blocks B11-B1n based on battery voltages Vb11-Vb1n and battery temperatures Tb11-Tb1n that are exhibited when any one of battery voltages Vb11-Vb1n of battery blocks B11-B1n becomes lower than reset voltage Vr1, ECU 50 resets the SOCs of battery blocks B11-B1n of first power storage unit 10 to the respective reset values thus set. Further, second power storage unit 20 is selected as the reset target, and substantially the same processing is performed so that the reset operation for all the battery blocks of second power storage unit 20 is completed.

[Second Modification]

For rapidly performing the reset operation while protecting the power storage units, a control structure according to a second modification to be described below may be employed instead of the control structure according to the first modification. The second modification differs from the foregoing embodiment in that the reset voltage is changed according to the battery temperature. Other structures are the same as those of the foregoing embodiment. Therefore, description thereof is not repeated.

Figure 15:
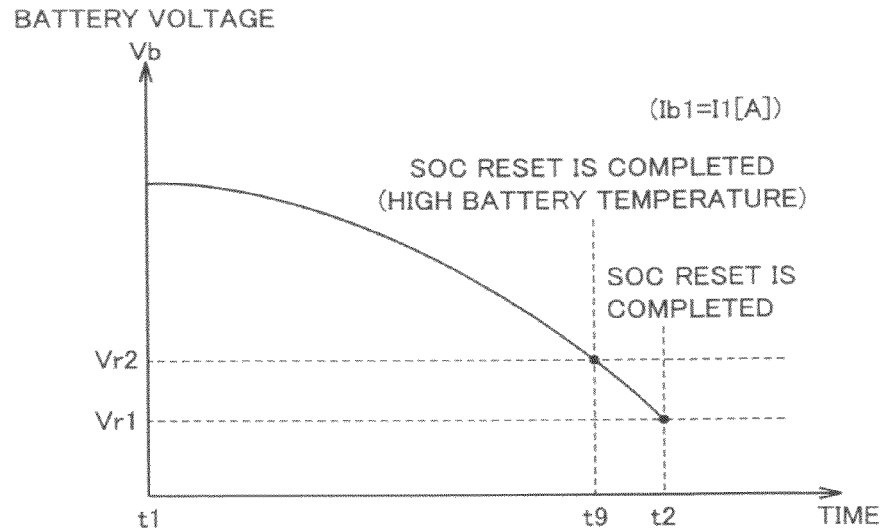
FIG. 15 illustrates changes in battery voltage during the reset operation according to a second modification of the embodiment of the invention.

FIG. 15 illustrates changes in battery voltage during the reset operation according to the second modification. In FIG. 15, first power storage unit 10 is the reset target, and battery voltages Vb11-Vb1n of battery blocks B11-B1n sensed by battery voltage sensing unit 120 (FIG. 2) are collectively referred to as "Vb".

Discharging unit 504 according to this modification has two different reset voltages Vr1 and Vr2 (Vr2>Vr1) of different values.

Discharging unit 504 selects one of reset voltage Vr1 and reset voltage Vr2 higher than reset voltage Vr1 based on the battery temperature exhibited at the start of the reset operation. More specifically, when the battery temperature at the start of the reset operation is higher than the predetermined upper temperature limit, discharging unit 504 selects reset voltage Vr2. When the battery temperature at the start of the reset operation is equal to or lower than the predetermined upper temperature limit, discharging unit 504 selects reset voltage Vr1.

As described above, when the battery temperature is equal to or higher than the predetermined upper temperature limit, the reset voltage is set to a relatively high voltage value. Thereby, when the battery temperature is higher than this upper temperature limit, the battery temperature becomes lower than the reset voltage according to more rapid timing than the case where the battery temperature is equal to or lower than upper temperature limit. Therefore, the discharge time period required for the reset operation can be short. Consequently, the reset operation of the power storage unit can be performed rapidly while protecting the power storage unit from the overheat.

Figure 16:
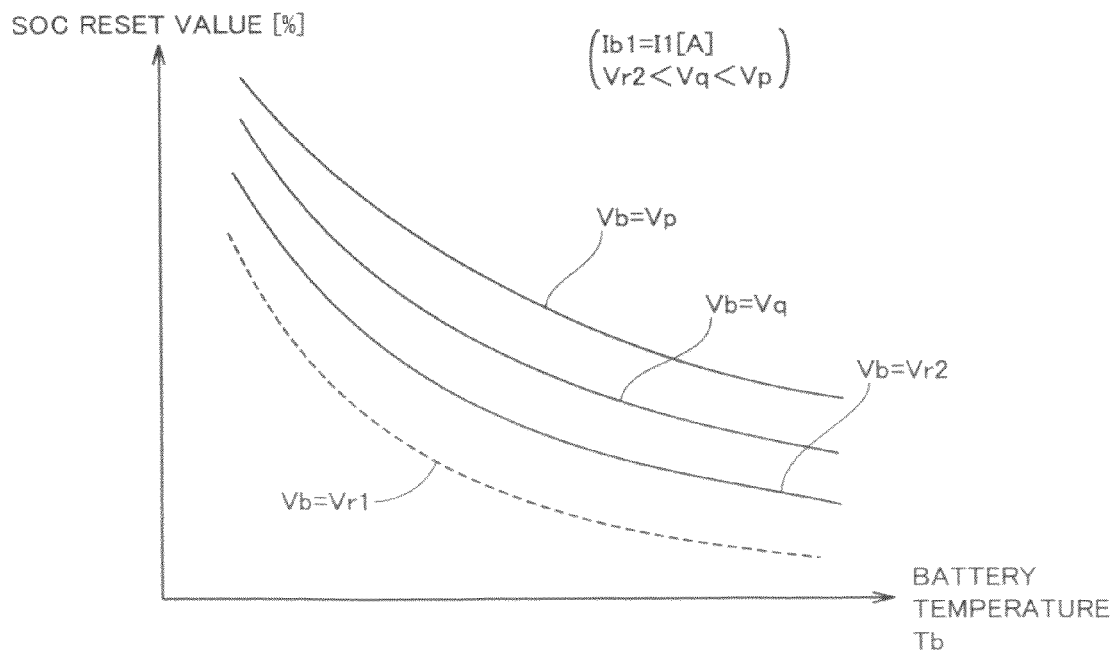
FIG. 16 shows a relationship between the corrected reset value and the battery temperature exhibited when a reset voltage Vr2 is used.

FIG. 16 shows a relationship between the corrected reset value and battery temperature Tb exhibited when reset voltage Vr2 is used. The relationship in FIG. 16 is obtained by correcting the relationship (represented by broken line in FIG. 16) between the reset value and the battery temperature shown in FIG. 4, and particularly is obtained by correcting it based on battery voltages Vb of the remaining battery blocks exhibited when battery voltage Vb of any one of the battery blocks becomes lower than reset voltage Vr2.

In the storage area (not shown), state estimating unit 502 stores in advance the relationship between the corrected reset value and battery temperature Tb in FIG. 16 as the reset value setting map. When battery voltage Vb of any one of the battery blocks becomes lower than reset voltage Vr2 and state estimating unit 502 receives battery voltages Vb and battery temperatures Tb of the remaining battery blocks at this point in time, state estimating unit 502 extracts the reset values corresponding to the battery voltages and battery temperatures for the remaining battery blocks from the reset value setting map, and sets them as the corrected reset values, respectively.

When the reset value is set for each of the remaining battery blocks, respectively, the SOCs of the remaining battery blocks are set to the reset values thus set, respectively. Consequently, the SOCs of all the battery blocks forming the power storage unit can be reset so that the estimation accuracy of the SOC of the power storage unit can be high.

Figure 17:
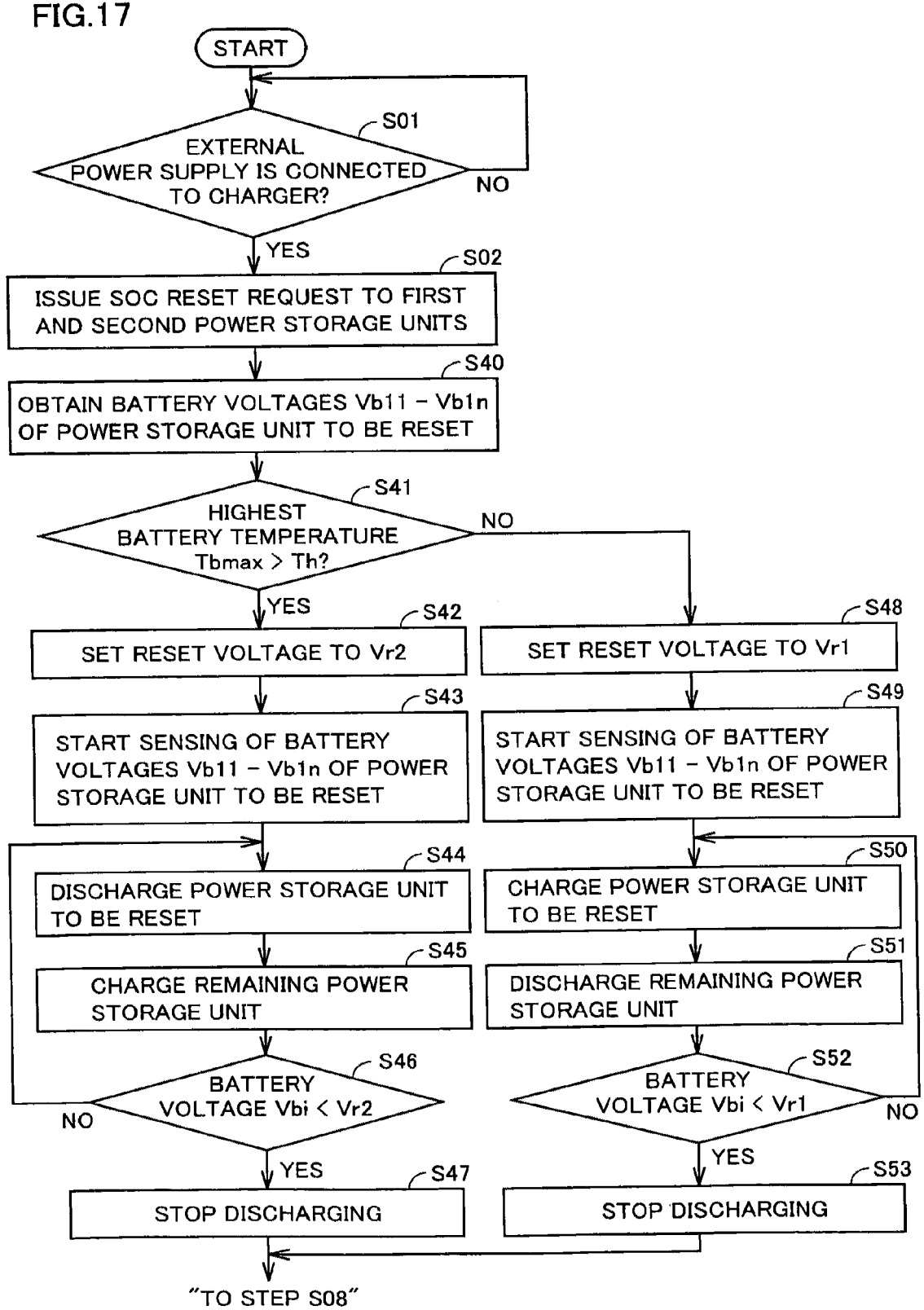
FIG. 17 is a flowchart showing the processing procedure of the reset operation according to the second modification of the embodiment of the invention.

FIG. 17 is a flowchart illustrating a processing procedure of the reset operation according to the second modification of the embodiment of the invention. The processing in the steps shown in FIG. 17 is implemented by ECU 50 (FIG. 1) operating as the various control blocks shown in FIG. 2.

Referring to FIGS. 2 and 17, ECU 50 operating as request issuing unit 500 determines whether external power supply 62 of the vehicle is connected to charger 40 or not, based on the coupling signal provided from coupling sensor 48 in FIG. 1 (step S01).

When external power supply 62 is not connected to charger 40 (NO in step S01), the process returns to the initial step.

Conversely, when external power supply 62 is connected to charger 40 (YES in step S01), ECU 50 operating as request issuing unit 500 determines that the charging by the external power supply is allowed, and issues the SOC1 reset request for first power storage unit 10 and the SOC2 reset request for second power storage unit 20 (step S02). In this modification, first power storage unit 10 is selected as the reset target similarly to the embodiment already describe. Therefore, the following description will be given on the reset operation of first power storage unit 10.

First, ECU 50 operating as discharging unit 504 obtains battery temperatures Tb11-Th1n (step S40) exhibited at the time when temperature sensing unit 122 (FIG. 2) included in battery monitor unit 12 corresponding to first power storage unit 10 issues the reset request. ECU 50 operating as discharging unit 504 specifies highest value (highest battery temperature) Thmax among battery temperatures Tb11-Tb1n thus obtained, and determines whether highest battery temperature Tbmax is higher than predetermined upper temperature limit Th or not (step S41).

When highest battery temperature Thmax is equal to or lower than upper temperature limit Th (NO in step S41), ECU 50 operating as discharging unit 504 selects reset voltage Vr1 (step S48).

Then, ECU 50 operating as discharging unit 504 receives the output from battery voltage sensing unit 120 (FIG. 2) included in battery monitor unit 12, and thereby starts the operation of sensing battery voltages Vb11-Vb1n of battery blocks B11-B1n (step S49).

Further, ECU 50 operating as discharging unit 504 controls first converter 14 to discharge first power storage unit 10 with a constant current (step S50), and controls the voltage converting operation of second converter 24 to charge second power storage unit 20 with at least the discharge current discharged from first power storage unit 10 (step S51).

ECU 50 operating as discharging unit 504 determines whether any one of battery voltages Vb11-Vb1n of battery blocks B11-B1n becomes lower than reset voltage Vr1 or not (step S52).

When none of battery voltages Vb11-Vb1n is lower than reset voltage Vr1 (NO in step S52), the process returns to step S50.

Conversely, when any one of battery voltages Vb11-Vb1n becomes lower than reset voltage Vr1 (YES in step S52), ECU 50 operating as discharging unit 504 stops the discharging of first power storage unit 10 (step S53). Then, the process proceeds to step S08 in the flowchart of FIG. 10.

More specifically, ECU 50 operating as state estimating unit 502 sets the reset values for battery blocks B11-B1n based on battery voltages Vb11-Vb1n and battery temperatures Tb11-Tb1n that are exhibited when any one of battery voltages Vb11-Vb1n becomes lower than reset voltage Vr1 (steps S08 and S09 in FIG. 10).

Returning to step S41, when highest battery temperature Tbmax is higher than upper temperature limit Th (YES in step S41), ECU 50 operating as discharging unit 504 selects reset voltage Vr2 (step S42).

Then, ECU 50 operating as discharging unit 504 receives the output from battery voltage sensing unit 120 (FIG. 2) included in battery monitor unit 12, and thereby starts the operation of sensing battery voltages Vb11-Vb1n of battery blocks B11-B1n (step S43).

Further, ECU 50 operating as discharging unit 504 controls first converter 14 to discharge first power storage unit 10 with a constant current (step S44), and controls the voltage converting operation in second converter 24 to charge second power storage unit 20 with at least the discharge current discharged from first power storage unit 10 (step S45).

Further, ECU 50 operating as discharging unit 504 determines whether at least one of battery voltages Vb11-Vb1n of battery blocks B11-B1n becomes lower than reset voltage Vr2 or not (step S46).

When none of battery voltages Vb11-Vb1n is lower than reset voltage Vr2 (NO in step S46), the process returns to step S44.

Conversely, when any one of battery voltages Vb11-Vb1n becomes lower than reset voltage Vr2 (YES in step S46), ECU 50 operating as discharging unit 504 stops the discharging of first power storage unit 10 (step S47). Then, the process proceeds to step S08 in the flowchart of FIG. 10.

Thus, ECU 50 operating as state estimating unit 502 refers to the reset value setting map in FIG. 16, and sets the reset values for battery blocks B11-B1n based on battery voltages Vb11-Vb1n and battery temperatures Tb11-Tb1n exhibited when any one of battery voltages Vb11-Vb1n becomes lower than reset voltage Vr2 (steps S08 and S09 in FIG. 10).

ECU 50 operating as state estimating unit 502 resets the SOCs of battery blocks B11-B1n of first power storage unit 10 to the reset values thus set, respectively (step S10 in FIG. 10). When the resetting of the SOCs of all battery blocks B11-B1n is completed, the reset operation for first power storage unit 10 ends. Subsequently, second power storage unit 20 is selected as the reset target, and substantially the same processing is performed. Thereby, the reset operation for all the battery blocks of second power storage unit 20 is completed.

According to the electrically powered vehicle of the embodiment of the invention, as described above, when the charging by the external power supply becomes possible, the corresponding converter is controlled to discharge the power storage unit to be reset. Based on the temporal changes in voltage value of the plurality of battery blocks that form the power storage unit to be reset, the estimated values of the states of charge (SOCs) of the battery blocks that are arithmetically obtained by the state estimating unit are reset to the reference values according to predetermined timing. In this operation, the reference values for the respective battery blocks are corrected such that these corrected reference values may contain variations in SOC between the battery blocks that are estimated based on the voltage values and temperatures of the battery blocks according to the predetermined timing. Thereby, the SOCs can be reset for all the battery blocks. Accordingly, the SOCs of the respective battery blocks can be estimated with high accuracy so that the estimation accuracy of the SOC of the power storage unit can be increased.

The embodiment has been discussed in connection with the structure in which the plurality of power storage units are arranged as the power storage system, and the power converter for controlling the charge/discharge currents of the respective power storage units are correlated to the respective power storage units. However, it is possible to employ a structure that includes a single power storage unit and a single power converting unit corresponding to this power storage unit.

In the structure of the above embodiment, the SOCs are reset when the charging with the external power supply becomes possible. However, another structure may be employed. For example, the reset operation may be executed by starting the discharge operation by inverter 28 such that the power storage unit is discharged with a constant current during the stop of driving of the vehicle. In this discharge operation, ECU 50 controls the switching operation of inverter 28 so that the current may flow in the direction not causing inverter 28 to generate a torque in motor generator 30.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An electrically powered vehicle comprising:
a power storage system for supplying an electric power to a drive source; and
a charge/discharge control device for charging and discharging said power storage system, wherein
said power storage system is formed of a plurality of chargeable and dischargeable power storage units connected in series,
said charge/discharge control device includes:
a discharging unit for discharging said power storage system with a constant current, and
a state-of-charge estimating unit estimating a state of charge of each of said plurality of power storage units, and resetting the states of charge of said plurality of power storage units to reference values according to predetermined timing based on temporal changes in voltage values of said plurality of power storage units during discharging of said power storage system, and
said state-of-charge estimating unit sets the respective reference values for said plurality of power storage units based on voltage values and temperatures of said plurality of power storage units exhibited according to said predetermined timing, and resets the states of charge of said plurality of power storage units to said set reference values, respectively.

2. The electrically powered vehicle according to claim 1, wherein
said discharging unit sets said predetermined timing such that the voltage value of any one of said plurality of power storage units reaches a predetermined reference voltage according to said predetermined timing, and
said state-of-charge estimating unit includes:
a first setting unit holding in advance a relationship between the temperature and the state of charge of each said power storage unit exhibited when the voltage value of said each power storage unit attains said predetermined reference voltage, and referring to said relationship to set the reference value for said one of the power storage units, and
a second setting unit setting the reference value for a remaining power storage unit by correcting the reference value for said one of the power storage units based on the voltage value of said remaining power storage unit.

3. The electrically powered vehicle according to claim 2, wherein
said second setting unit holds in advance a relationship between the voltage value of said power storage unit and the state of charge of said power storage unit exhibited when said power storage unit is discharged with said constant current, and estimates a difference in state of charge between said remaining power storage unit and said one of the power storage units with reference to said relationship.

4. The electrically powered vehicle according to claim 3, wherein
said discharging unit varies a discharge current of said power storage system according to the temperatures of said plurality of power storage units at the start of discharging said power storage system.

5. The electrically powered vehicle according to claim 3, wherein
said discharging unit varies a discharge current of said power storage system according to the voltage values of said plurality of power storage units.

6. The electrically powered vehicle according to claim 2, wherein
said state-of-charge estimating unit varies said predetermined reference voltage according to the temperatures of said plurality of power storage units at the start of discharging said power storage system.

7. The electrically powered vehicle according to claim 1, further comprising:
a charger receiving an electric power from an external power supply and performing external charging on said power storage system, wherein
said discharging unit discharges said power storage system with a constant current when said power storage system enters a state allowing charging with the external power supply, and
said charge/discharge control device further includes a charging unit externally charging said power storage system after the states of charge of said plurality of power storage units are reset to said reference values.

8. The electrically powered vehicle according to claim 7, wherein
said power storage system includes a plurality of power storage devices connected in parallel with each other to said drive source, and each formed of said plurality of power storage units connected in series,
said electrically powered vehicle further comprises a plurality of voltage converting units corresponding to said plurality of power storage devices, respectively, and
said discharging unit controls the voltage converting unit corresponding to the first power storage device among said plurality of power storage devices to discharge said first power storage device, and controls the voltage converting unit corresponding to the remaining power storage device to charge said remaining power storage device with a current discharged from at least said first power storage device when said plurality of power storage devices enters a state allowing charging with the external power supply.

* * * * *